US012741408B2

(12) United States Patent
George, Jr. et al.

(10) Patent No.: US 12,741,408 B2
(45) Date of Patent: Sep. 22, 2026

(54) MONITORING SYSTEM FOR STRAW MANUFACTURING APPARATUS

(71) Applicant: New WinCup Holdings, Inc., Stone Mountain, GA (US)

(72) Inventors: Paul Daniel George, Jr., Jacksonville, FL (US); Eli V. Whisnant, Stone Mountain, GA (US)

(73) Assignee: New WinCup Holdings, Inc., Stone Mountain, GA (US)

( * ) Notice: Subject to any disclaimer, the term of this patent is extended or adjusted under 35 U.S.C. 154(b) by 85 days.

(21) Appl. No.: 18/650,992

(22) Filed: Apr. 30, 2024

(65) Prior Publication Data

US 2024/0278476 A1 Aug. 22, 2024

Related U.S. Application Data

(63) Continuation-in-part of application No. 16/879,479, filed on May 20, 2020, now Pat. No. 11,974,683.
(Continued)

(51) Int. Cl.
*B29C 48/92* (2019.01)
*A47G 21/18* (2006.01)
(Continued)

(52) U.S. Cl.
CPC .............. *B29C 48/92* (2019.02); *A47G 21/18* (2013.01); *B29C 48/022* (2019.02); *B29C 48/32* (2019.02);
(Continued)

(58) Field of Classification Search
CPC ....... B29C 48/92; B29C 48/022; B29C 48/32; B29C 48/919; B29C 2948/92923;
(Continued)

(56) References Cited

U.S. PATENT DOCUMENTS 3,169,272 A 2/1965 Maxson
3,184,791 A 5/1965 Gamble et al.
(Continued)

FOREIGN PATENT DOCUMENTS

DE 102017123940 A1 * 5/2018 ............ B29B 7/845
JP 2005350350 A 12/2005
(Continued)

*Primary Examiner* — Andrew W Bee
*Assistant Examiner* — D J Dhooge
(74) *Attorney, Agent, or Firm* — Condo Roccia Koptiw LLP

(57) ABSTRACT

Apparatus and methods for manufacturing compostable, biodegradable drink straws from polyhydroxyalkanoate (PHA) material are disclosed herein. Such apparatus may include a hopper that contains raw PHA material, an extruder that receives the raw PHA material from the hopper and produces extruded PHA material, one or more waters baths that cool the extruded PHA material, a puller that pulls a tubular stream of PHA material through the system, and a cutter that is configured to cut the stream of PHA material into finished straws. A vision system may be provided to monitor a diameter and material thickness of the cooled PHA material. The finished straws may be soil- and marine-biodegradable, as well as home- and industrial-compostable.

7 Claims, 20 Drawing Sheets

Related U.S. Application Data

(60) Provisional application No. 62/850,520, filed on May 20, 2019.

(51) Int. Cl.

*B29C 48/00* (2019.01)
*B29C 48/32* (2019.01)
*B29C 48/88* (2019.01)
*B29K 67/00* (2006.01)

(52) U.S. Cl.

CPC ........ *B29C 48/919* (2019.02); *A47G 2400/10* (2013.01); *B29K 2067/04* (2013.01)

(58) Field of Classification Search

CPC .... B29C 48/09; A47G 21/18; A47G 2400/10; B29K 2067/04

See application file for complete search history.

(56) References Cited

U.S. PATENT DOCUMENTS

| | | | | |
|---|---|---|---|---|
| 3,922,328 | A | 11/1975 | Johnson | |
| 3,993,726 | A | 11/1976 | Moyer | |
| 4,068,615 | A | 1/1978 | Lenir | |
| 4,548,778 | A | 10/1985 | Fujii | |
| 4,575,326 | A | 3/1986 | French | |
| 4,750,873 | A | 6/1988 | Loe et al. | |
| 5,226,998 | A | 7/1993 | Few | |
| 6,257,863 | B1 | 7/2001 | Otte | |
| 6,461,468 | B1 | 10/2002 | Cohen | |
| 6,620,354 | B1 | 9/2003 | Bessemer et al. | |
| 9,868,241 | B1 | 1/2018 | Coulson | |
| 12,221,538 | B2 | 2/2025 | Okura | |
| 2002/0084012 | A1 | 7/2002 | Solar et al. | |
| 2002/0162619 | A1 | 11/2002 | Shibuya et al. | |
| 2003/0206990 | A1 | 11/2003 | Edmondson et al. | |
| 2003/0217648 | A1 | 11/2003 | Noda et al. | |
| 2005/0008806 | A1 | 1/2005 | Schewe et al. | |
| 2007/0182041 | A1 | 8/2007 | Rizk et al. | |
| 2012/0013037 | A1 | 1/2012 | Riebel et al. | |
| 2016/0009912 | A1 | 1/2016 | Wang et al. | |
| 2016/0089846 | A1 | 3/2016 | Mccartney et al. | |
| 2017/0157824 | A1 | 6/2017 | Ward et al. | |
| 2018/0339129 | A1 | 11/2018 | Ganatra et al. | |
| 2019/0255754 | A1* | 8/2019 | Lettowsky | G01B 11/306 |
| 2020/0095420 | A1* | 3/2020 | Johnson | B29C 48/919 |
| 2021/0301127 | A1 | 9/2021 | Okura | |
| 2022/0274308 | A1* | 9/2022 | Salter | B29C 48/022 |

FOREIGN PATENT DOCUMENTS

| | | | |
|---|---|---|---|
| JP | 2005350530 | A | 12/2005 |
| JP | 2006136657 | A | 6/2006 |
| WO | 0037119 | A1 | 6/2000 |

* cited by examiner

C
181T
C
106E
106
108B
187
183
182
181
185
105

MONITORING SYSTEM FOR STRAW MANUFACTURING APPARATUS

CROSS-REFERENCE TO RELATED APPLICATIONS

This application is a continuation-in-part of U.S. patent application Ser. No. 16/879,479, filed on May 20, 2020, which claims benefit of provisional U.S. patent application No. 62/850,520, filed on May 20, 2019, the disclosure of which is incorporated herein by reference.

BACKGROUND

Traditional drink straws may be made of a plastic or thermoplastic polymer material, such as polypropylene, for example. Typically, such materials, and consequently, straws made of such materials, are usually neither biodegradable nor compostable.

Efforts are being made to produce straws that are soil-biodegradable, marine-biodegradable, home-compostable, and industrial-compostable. A challenge has been to produce a biodegradable and compostable straw that also has thermoplastic and mechanical properties that are acceptable for consumer use.

Polyhydroxyalkanoate (PHA) is an example of a material that has better compostable and biodegradable properties than other polymer materials from which straws are typically made. However, there have been challenges associated with processing PHA material into straws, as the PHA material has thermoplastic and mechanical properties that are different from those of the polymer materials that are typically used to produce straws. Thus, there is a need in the art for apparatus and methods for manufacturing compostable, biodegradable straws from PHA material.

SUMMARY

Apparatus and methods for manufacturing drink straws from polyhydroxyalkanoate (PHA) material are disclosed herein. An example of such apparatus may include a hopper that contains raw PHA material, and an extruder that receives the raw PHA material from the hopper and produces extruded PHA material.

Molten PHA material may be provided from the extruder through an extruder die. The extruder die may be configured to produce a stream of extruded PHA material that has a tubular shape. The extruder die may include a pin that at least partially defines a material channel within the extruder die. The molten PHA material is channeled through the material channel. An end portion of the material channel corresponds to a desired material thickness of the stream of extruded PHA material. The pin may also define an air channel along a longitudinal axis thereof. Compressed air may be provided via the air channel into a hollow portion of the stream of extruded PHA material as it exits the die.

The extruded PHA material may be pulled through one or more water baths. The system may include a puller configured to pull the PHA material out of the extruder die and through the water baths. Such a puller may include one or more puller belts composed of a material that enables the puller belt to grip and pull a stream of cooled PHA material. The stream of cooled PHA material may contain at least 50% PHA and have a tubular shape. To avoid crushing the PHA material, the puller belts may be composed of a material having a durometer of between about 30 and about 55.

One of the water baths may be a pre-sizing water bath that is configured to receive the extruded PHA material from the extruder, to cause the extruded PHA material to begin to crystallize to form crystalizing PHA material, and to provide the crystalizing PHA via a sizing tube to a second water bath. The pre-sizing water bath may contain water having a temperature of between about 120° F. and about 145° F., while the extruded PHA material may have a temperature of about 300° F. to about 330° F. The sizing tube may be configured to form the crystallizing PHA material into a stream of PHA material having a tubular shape that is suitable for being cut to size to form PHA drink straws.

A vision system may be provided to monitor a diameter and material thickness of the cooled PHA material. The vision system may include a light projector configured to project light onto the cooled PHA material as the cooled PHA material is being pulled into the puller, and a camera configured to receive light that has passed through or around the cooled PHA material as the cooled PHA material is being pulled into the puller.

A drink straw produced by such an apparatus may have a tubular body that is made of a PHA material. Such a straw may be marine-biodegradable, soil-biodegradable, home-compostable, and industrial-compostable. For example, such a straw may degrade by as much as 80% in a marine environment within one to two years. Testing has shown that such straws may degrade by as much as 88% in a marine environment in as few as 97 days.

DETAILED DESCRIPTION

Figure 1:
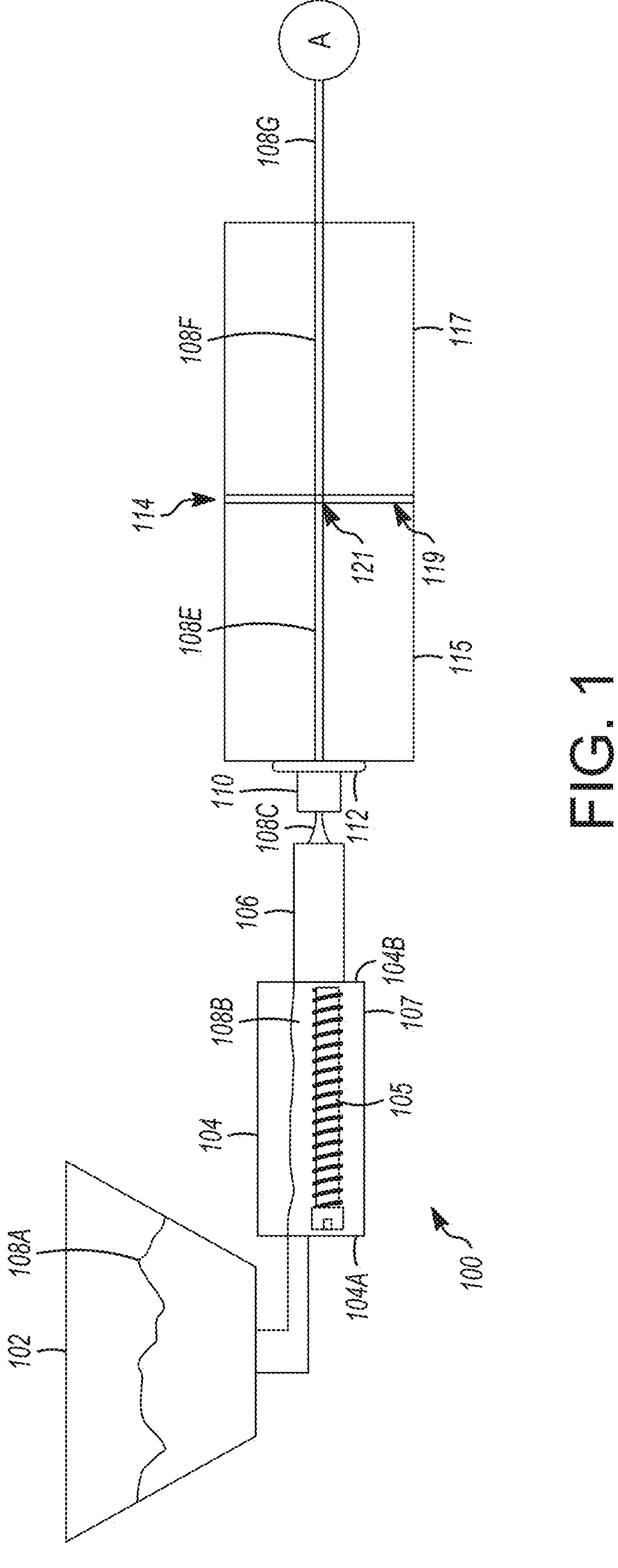
FIG. 1 is a system diagram illustrating example apparatus and methods as disclosed herein for manufacturing PHA straws.
Figure 1:
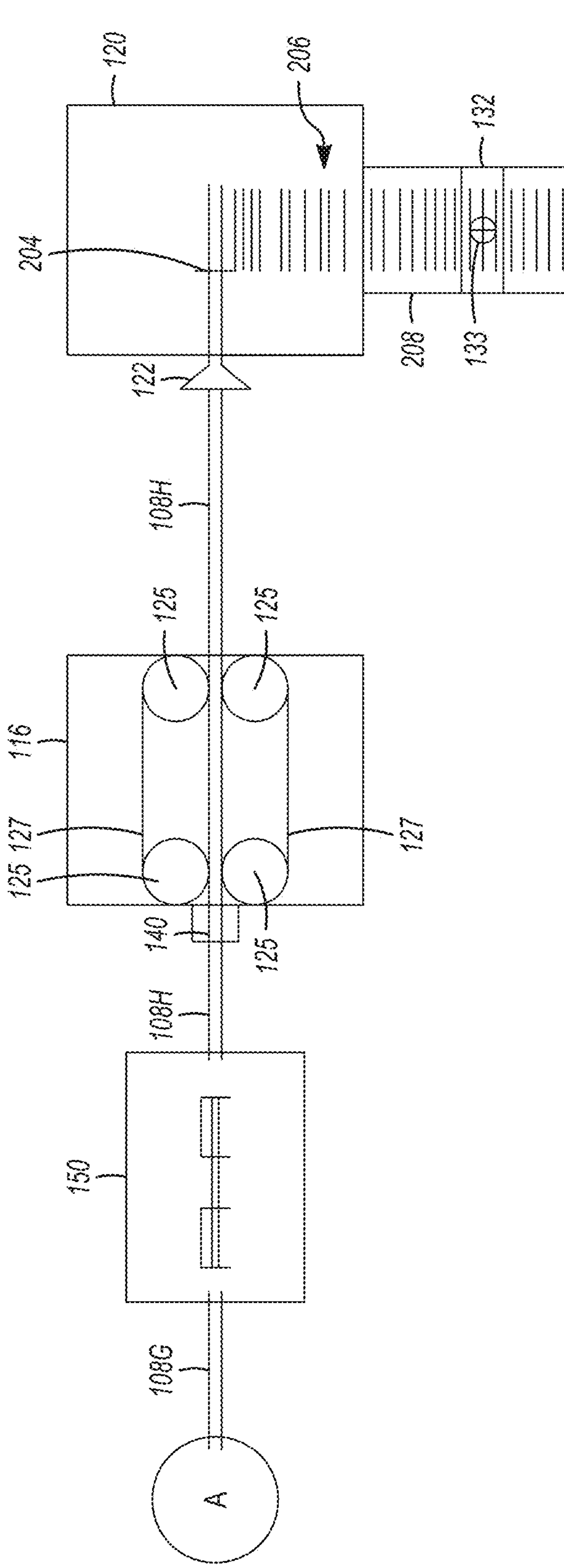

FIG. 1 is a system diagram illustrating an example system 100 for manufacturing drink straws from polyhydroxyalkanoate (PHA) materials. As shown in FIG. 1, the system 100 may include a hopper 102. The hopper 102 may receive raw PHA material 108A. As used herein, the term PHA material refers to any material that is made of at least 30% PHA by weight. Accordingly, the raw PHA material 108A may be a raw material that contains at least 30% PHA, preferably at least 50% PHA, and more preferably about 80-85% PHA. The raw PHA material 108 may be provided to the hopper in pellet form. Thus, the raw PHA material 108A may include pellets that are made of a material that contains at least 30% PHA, i.e., PHA pellets. The hopper 102 may also receive color additives for changing the color of the raw materials. The color additives may be mixed into the raw PHA material 108A.

The raw PHA material 108A may be transferred from the hopper 102 to an extruder 104. The extruder 104 may melt the raw PHA material 108A to form molten PHA material 108B. That is, the PHA pellets may be transferred to the extruder 104, where the PHA pellets may be melted to form a fluid. The extruder 104 may be a screw-and-barrel extruder. A screw-and-barrel extruder may have an auditor compression-type screw 105 inside a cylindrical barrel 107. The extruder screw 105 may push the molten PHA material 108B through the cylindrical extruder barrel 107. The extruder screw 105 may draw the raw PHA material 108A from the hopper 102 and meter the molten PHA material 108B toward a die 106.

To melt the raw PHA material 108A, the extruder 104 may be configured to have a temperature profile. That is, the extruder 104 may be configured such that the temperature within the extruder is lower at the end 104A of the extruder 104 that receives the raw PHA material 108A from the hopper 102, than it is at the end 104B of the extruder 104 that provides the molten PHA material 108B to the die 106. In other words, the temperature within the extruder barrel 107 may increase from one end 104A of the extruder 104 to the other end 104B.

For example, the temperature profile of the extruder 104 may range from about 290° F. at the end 104A of the extruder 104 that receives the raw PHA material 108A from the hopper 102, to about 390° F. at the end 104B of the extruder 104 that provides the molten PHA material 108B to the die 106. The temperature at the end 104A of the extruder 104 may be between about 290° F. and 340° F. The temperature at the end 104B of the extruder 104 may be between about 340° F. and 390° F. The length of the extruder 104 in the direction along which the molten PHA material 108B is being pushed may be about 90 to about 145 inches.

Before using the extruder 104 for manufacturing PHA drink straws in accordance with the methods disclosed herein, it may be desirable to purge the extruder 104. That is, it may be desirable to remove any raw materials that might have been used in a previous straw-making process in order to prepare the extruder 104 for use with PHA material. For example, an extruder that is to be used to manufacture PHA drink straws may have been used previously for extruding a different material, such as a polypropylene material, for example. In such event, any residual polypropylene material may be purged from the extruder 104 using a chemical, such as an ethylene (e.g., polyethylene). Purging the extruder as such allows for bridging the transition from a first temperature profile used for melting and extruding a first material, such as a polypropylene-based material, for example, to a second temperature profile used for melting and extruding a second material, such as a PHA-based material, for example. Such a purging process enables clean use of PHA material for making drink straws.

Figures 2A, 2B:
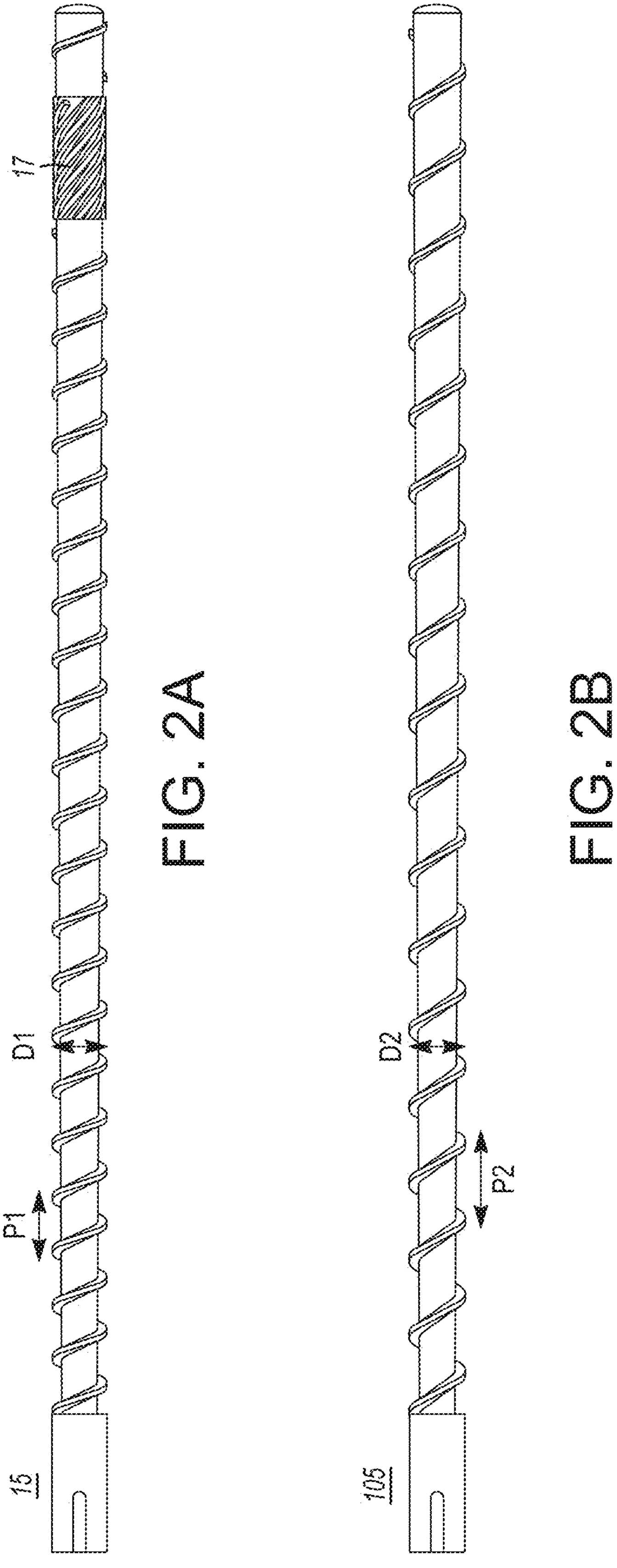
FIG. 2A depicts a typical extruder screw for use in manufacturing prior art drink straws.
FIG. 2B depicts an example extruder screw for use in manufacturing PHA drink straws in accordance with the methods disclosed herein.

FIGS. 2A and 2B depict example extruder screws. FIG. 2A depicts a typical high-shear, high-volume, mixing screw 15 that might be commonly used in manufacturing prior art drink straws from polymer materials that are not PHA materials. Polypropylene is an example of such a material. FIG. 2B depicts an example low-shear, low-volume, non-mixing screw 105 that has been developed for use in manufacturing PHA drink straws in accordance with the methods disclosed herein. Such a low-shear, low-volume, non-mixing screw is desirable to prevent overworking the PHA material in the extruder 104.

As shown, screw 15 includes a mixing section 17. Screw 105 has no such mixing section. Also, the thread pitch P2 of screw 105 is greater than the thread pitch P1 of screw 15, and the crest-to-crest diameter D2 of screw 105 is smaller than the crest-to-crest diameter D1 of screw 15. The greater thread pitch P2 and smaller crest-to-crest diameter D2 of screw 105 conspire to reduce the amount of shear within the extruder 104. The greater thread pitch P2 and smaller crest-to-crest diameter D2 also conspire to reduce the flow rate of the molten material 108B through the extruder 104. The flow rate at which the molten material 108B is pushed through the extruder 104 is reduced by reducing the volume of molten material 108B produced in the extruder 104 in a given amount of time.

As mentioned above, the extruder screw 105 pushes the molten PHA material 108B through a die 106. The die 106 may receive the molten PHA material 108B from the extruder 104 and form the molten PHA material 108B into a tube. The temperature at the die 106 may be lower than in the end 104B of the extruder 104 to create back-pressure and a steadier flow so that the PHA material is less sticky and less brittle. The temperature at the die 106 may be slightly higher than at the feed throat, and can range from 290 F to 340 F, like the feed throat.

Figure 3:
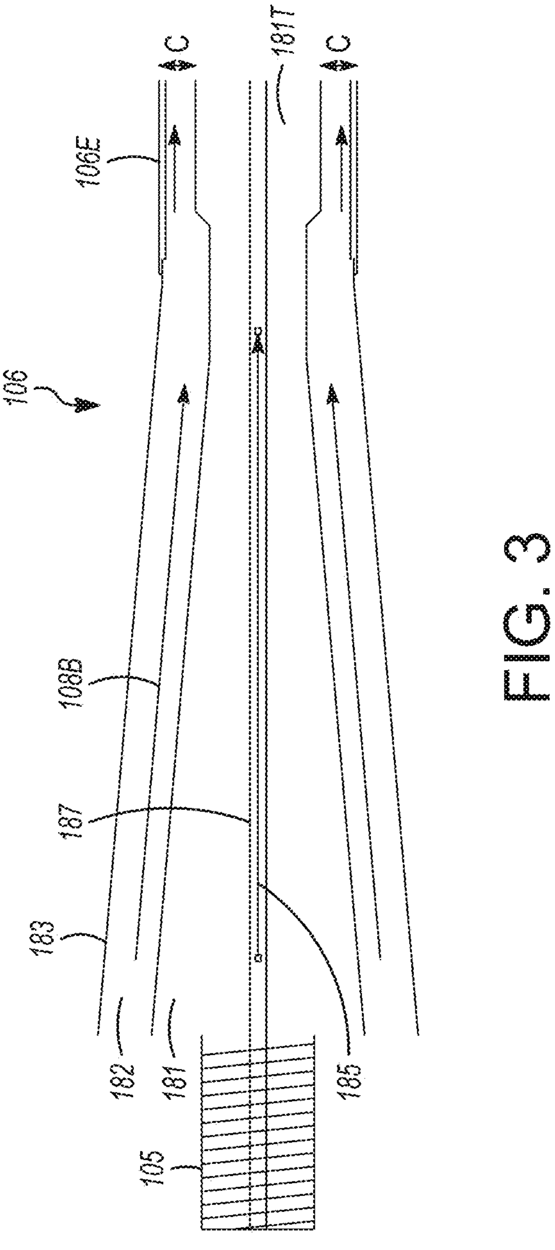
FIG. 3 depicts an example extrusion die for use in manufacturing PHA drink straws in accordance with the methods disclosed herein.

FIG. 3 is a cross-sectional view of an example extrusion die 106 for use in manufacturing PHA drink straws in accordance with the methods disclosed herein. As shown, an end portion 106E of the die 106 may be generally tubular in shape. The die 106 may have a body portion 183 and a pin 181. The pin 181 may be disposed within a bore defined by the body portion 183. A material channel 182 may be defined between the pin 181 and the body portion 183. The molten PHA material 108B may be received into the material channel 182 and pushed through the die by the extruder screw 105.

At the end 106E of the die 106 opposite the extruder 104 (i.e., where the extruded PHA material 108C exits the die 106), the material channel 182 may be defined by the inner surface of the body portion 183 and the tip 181T of the pin 181. For manufacturing a PHA straw having an inner diameter of about 200 mils, the clearance, C, between the outer surface of the pin tip 181T and the inner surface of the body portion 183 at the end 106E of the material channel 182 may be about 104 mils. The inner diameter of the body portion 183 may be about 734 mils, while the outer diameter of the pin tip 181T may be about 630 mils. Thus, the "draw down" from the outer diameter of the pin tip 181T to the inner diameter of the straw would be about 430 mils. In another example, for manufacturing a PHA straw having an inner diameter of about 98 mils, the clearance, C, between the outer surface of the pin tip 181T and the inner surface of the body portion 183 at the end 106E of the material channel 182 may be about 90 mils. The inner diameter of the body portion 183 may be about 535 mils, while the outer diameter of the pin tip 181T may be about 445 mils. Thus, the "draw down" from the outer diameter of the pin tip 181T to the inner diameter of the straw would be about 347 mils.

The die 106 may also include an air channel 187 that runs along the longitudinal axis of the die 106. Compressed air 185 may be forced down the air channel 187 from an air compressor (not shown) and into the center portion of the extruded PHA material 108C as it exits the die 106 to help the extruded PHA material 108C maintain its tubular shape.

The extruded PHA material 108C may be pulled from the die 106 by a puller 116. The extruded PHA material 108C may be pulled through a two-stage water bath 114 after having been fed through a sizing ring 112. Additionally, the extruded PHA material 108C may be pulled through a pre-sizing water bath 110 prior to being fed through the sizing ring 112.

Figure 4:
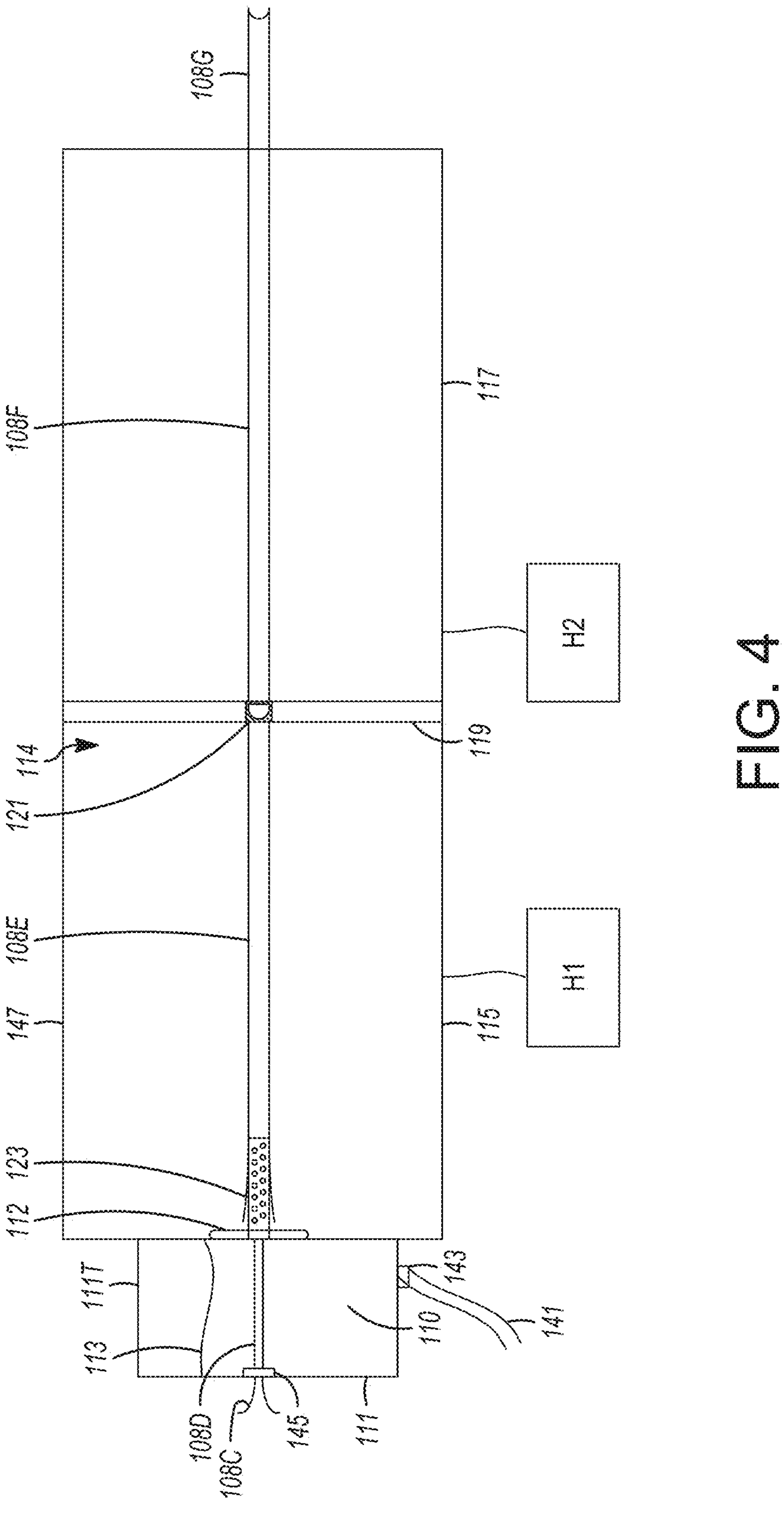
FIG. 4 depicts an example pre-sizing water bath and an example two-stage water bath for use in manufacturing PHA drink straws in accordance with the methods disclosed herein.

FIG. 4 depicts an example pre-sizing water bath 110 for use in manufacturing PHA drink straws in accordance with the methods disclosed herein. The pre-sizing water bath 110 may include a water containment tank 111. The top 111T of the tank 111 may be open or closed.

The water 113 contained in the pre-sizing water bath 110 may have a depth that is sufficient to cover the PHA material 108D that is being pulled through the water bath 110. For example, the water 113 contained in the pre-sizing water bath 110 may have a depth that is at least the diameter of the extruded PHA material 108C. Consequently, the pre-sizing water bath 110 may have a height that is at least the diameter of the extruded PHA material 108C. The length of the pre-sizing water bath 110 (i.e., in the direction along which the extruded PHA material 108C is being pulled) may be at least about 4 inches, preferably within a range of about 4 to 5 inches.

The pre-sizing water bath 110 may be a hot water bath. That is, the pre-sizing water bath 110 may contain water that has been heated to a temperature that is greater than about 125° F. For example, the pre-sizing water bath 110 may contain water at a temperature that is within a range of about 125° F. to about 150° F. Preferably, the temperature of the water contained in the pre-sizing water bath 110 is within a range of about 125° F. to 135° F.

As described above, the end 104B of the extruder 104 from which the molten PHA material 108B is provided to the die 106 may be at a temperature of about 355° F. After exiting the die, the molten PHA is dropped to 325° F. A threshold temperature for crystallization of the extruded PHA material 108C may be in the range of 125° F. to 135° F. Consequently, it may be desirable for the water contained in the pre-sizing water bath 110 to have a minimum temperature of at least about 55° F. to 65° F. The change in temperature from the 325° F. coming out of the die, to the 55-65° F. water bath 110, may shock the extruded PHA material 108C into beginning a crystallization process. This change in temperatures may speed up the crystallization process by changing the rate of crystallization of the extruded PHA material 108C. The tank of the pre-sizing water bath 110 may be a non-vacuum container (e.g., open at the top) to allow for the extruded PHA material 108C to begin to crystallize without being affected by a vacuum-sealed environment.

The rate of crystallization of the crystallizing PHA material 108D in the pre-sizing water bath 110 was tested as follows. Extruded PHA material 108C was forced out of the extruder 104, the die-end 104B of which was at a temperature of about 325° F., and pulled into the pre-sizing water bath 110. Tests were conducted with the temperature of the water contained in the pre-sizing water bath 110 at various temperatures from about 60° F. up to about 135° F. Tests were conducted with the water contained in the pre-sizing water bath 110 having temperatures from 45° F. to 135° F. as it was hypothesized that the initial temperature change to cooler temperatures would trigger a faster change in the crystallization rate of the extruded PHA material 108C. However, the faster changes in crystallization rate desired for the process were triggered when the water contained in the pre-sizing water bath 110 was at a temperature in the range of about 125° F. to 135° F. Thus, it was observed that the extruded PHA material 108C crystalizes faster when surrounded by hotter water temperatures in the water bath 110. Faster changes were indeed triggered at even lower temps, 55-65° F., so PHA material 108C starts to crystallize faster when surrounded by cooler water temperatures in the water bath 110. The faster crystallization causes the crystallizing PHA material 108D to become harder faster to allow for the PHA material to be processed more quickly through the straw making process. Consequently, the crystallizing PHA material 108D may enter into the sizing ring 112 and/or a sizing tube (described below) with a greater tensile strength for processing due to the crystallization being triggered by the temperature of the pre-sizing water bath 110.

Thus, extruded PHA material 108C may be lubricated and/or crystalized as it is pulled through the pre-sizing water bath 110. Being pulled through the water bath 110 may strengthen the PHA material for being pulled by the puller 116 and/or through the sizing ring 112. The PHA material being lubricated and/or crystalized may give the PHA material the physical characteristics to be pulled through the sizing ring 112 without breaking or becoming inconsistent.

As mentioned above, the extruded PHA material 108C may be pulled from the die 106 and eventually through a sizing ring 112 by a puller 116. The sizing ring 112 may be circular in shape and may have an opening that corresponds to a diameter of the straw being manufactured from the PHA material. It has been discovered that the PHA material may be too soft to be fed through traditional baffles that are typically used when making drink straws from other materials, such as polypropylene, for example.

As shown in FIG. 1, and in detail in FIG. 4, the extruded PHA material 108C may be pulled through a two-stage water bath 114 after having been fed through the sizing ring 112. The two-stage water bath 114 may include a vacuum-sealed tank or housing 147. The sizing ring 112 may be external to the two-stage water bath 114, as shown in FIG. 1, or internal to the tank 147, as shown in FIG. 4.

A sizing tube 123 may be connected to the sizing ring 112. The sizing tube 123 may extend a distance from the sizing ring 112 into the water bath 114. For example, the sizing tube 123 may extend about three to five inches into the water bath 114. The sizing tube 123 may be configured to control the diameter and wall thickness of the straw. For example, the sizing tube 123 may define a bore that extends longitudinally therethrough. The bore may have a diameter that corresponds to the diameter of the straw being manufactured. That is, the sizing tube may have an inner diameter that corresponds to the outer diameter of the straw being manufactured. The sizing tube may have an inner diameter that is about 40% bigger than the desired outer diameter of the straw. For example, if the desired outer diameter of the finished straw product is about 286 mils, the inner diameter of the sizing tube may be about 396 mils. The outer diameter of the sizing tube may be about 492 mils. Due to differences in material characteristics, the sizing tube 123 may be about twenty-five thousandths of an inch larger than a comparable sizing tube that may be used for making straws of other material (e.g., polypropylene) to obtain a proper straw diameter.

The sizing tube 123 may define a plurality of holes through the outer surface thereof. Water may be pulled through the holes by the vacuum in the tank to lubricate and cool the PHA material 108E as it is being pulled into the two-stage water bath 114. The straws may be defined at half-inch intervals along the tubular walls of the sizing ring. The size of the sizing tube 123, and the configuration of the holes, affects the amount of water that is pulled into the interior of the sizing ring. This, for its part, controls the material thickness of the PHA material 108E being pulled through the sizing tube 123.

As shown in FIG. 4, the two-stage water bath 114 may include a housing 147. A wall 119 may be disposed within the housing 147. The wall 119 and the housing 147 may cooperate to define a first chamber 115 within the housing and a second chamber 117 within the housing. Thus, the wall may be disposed between the first chamber 115 and the second chamber 117, and thereby separate the first chamber 115 and the second chamber 117. The first chamber 115 may be configured to receive extruded PHA material 108C from the extruder or crystallizing PHA material 108D from the pre-sizing water bath 110. The first chamber 115 may be a relatively cool-water bath that contains water having a first temperature. The second chamber 117 may be a relatively warm-water bath that contains water having a second temperature that is higher than the first temperature. Thus, crystallization initialization may be completed in a cold bath, while the second chamber "stabilizes" the crystallization in a warm bath. The second chamber 117 may be configured to receive first cooled PHA material 108E from the first chamber and to produce second cooled (albeit re-warmed) PHA material 108F.

The water in the first chamber 115 of the water bath 114 may be kept at a temperature within a range of about 45° F. to about 80° F. In another example, the water in the first chamber 115 of the water bath 114 may be kept at a temperature within a range of about 50° F. to 60° F., or within a range of about 55° F. to 65° F., or within a range of about 60° F. to 70° F. The first chamber 115 of the water bath 114 may be about 7 to 10 feet long. A first temperature control system H1 may be provided to maintain the desired temperature of the water in the first chamber 115. For example, the first temperature control system H1 may be a chiller, as the desired temperature of the water in the first chamber 115 will typically be below room temperature.

The water in the second chamber 117 of the water bath 114 may be kept at a temperature within 125° F. to 145° F. The water in the second chamber 117 of the water bath 114 may warm the PHA material 108F to its crystallization temp of 135 F over a period of time to solidify the PHA material 108F and/or strengthen the PHA material 108F. The water in the second chamber 117 of the water bath 114 may stabilize the PHA material 108F at its crystallization threshold to solidify the PHA material 108F and/or strengthen the PHA material 108F more quickly than pulling the PHA material 108F through colder temperatures. A second temperature control system H2 may be provided to maintain the desired temperature of the water in the second chamber 117. For example, the second temperature control system H2 may be a heater/cooler system, as the desired temperature of the water in the second chamber 117 may be above or below room temperature.

Crystallization of the PHA material 108E may be expedited in the cooler chamber 115 of the water bath 114, so the second chamber 117 of the water bath 114 may make the PHA material 108F warmer to bring it closer to its ideal crystallization temperature. The PHA material 108E/108F may be in each of the chambers 115, 117, respectively, for a period of time within a range of about one to three seconds. For example, the PHA material 108E may be in the first chamber 115 of the water bath 114 for a period of time within a range of about 1.5 to 2 seconds, or for about 1.8 to 2 seconds. In an example process, the first chamber 115 of the water bath 114 may be about 10 feet long, and the second chamber 117 of the water bath 114 may be about 10 feet long. The PHA material 108E/108F may be processed at a speed of about 330 feet per minute, such that the PHA material 108E/108F may be in each of the chambers 115, 117 of the water bath 114 for about 1.8 seconds.

The wall 119 may include a gasket 121 through which the PHA material 108E may be pulled into the second chamber 117 by the puller 116. The cooled PHA material 108G may not be fully hardened once it is received at the puller 116, as PHA material may harden more slowly than other materials that may be used for straws, such as polypropylene, for example. Accordingly, the two-stage water bath 114 may be longer than typical single-stage water baths used for making straws out of other material in order to allow for the PHA material 108E/108F to have more time in the water bath 114 to strengthen. For example, the water bath 114 may be between 20 and 30 feet in length. In an example, the water bath 114 may be 20 to 22 feet long.

Figure 5A:
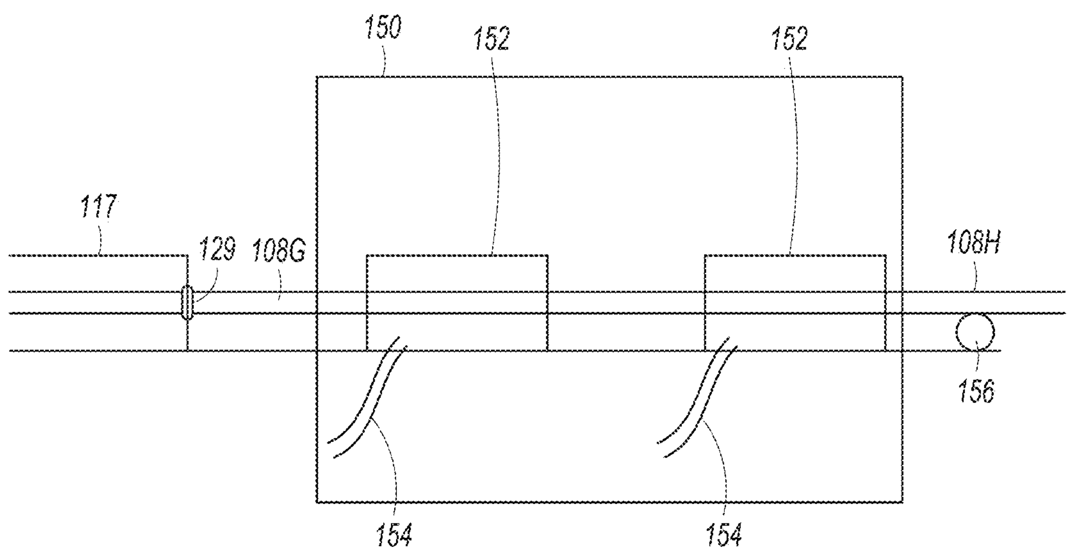
FIGS. 5A and 5B depict an example water removal system for use in manufacturing PHA drink straws in accordance with the methods disclosed herein.

As shown in FIG. 1, a water removal system 150 may be provided to remove excess water that may remain on the PHA material 108G after the PHA material 108G is pulled out of the two-stage water bath 114. FIG. 5A depicts an example water removal system 150 for use in manufacturing PHA drink straws in accordance with the methods disclosed herein.

As shown in FIG. 5A, the second chamber 117 of the two-stage water bath 114 may be fitted with a gasket 129 through which the PHA material 108G may be pulled. The gasket 129 may be made of a rubber material, and may have an inner diameter that corresponds to the diameter of the PHA material 108G. Thus, the gasket 129 may function to remove excess water from the outer surface of the PHA material 108G as it is pulled through the gasket 129.

The water removal system 150 may include one or more air rings 152. Each of the air rings 152 may be fed by a respective incoming compressed air line 154. Regulators (not shown) may be attached to the compressed air lines 154 to control the air pressure that is delivered to the air rings 152. The air pressure may be in a range of about 40 to about 60 psi. As the PHA material 108G is pulled through the air rings, the compressed air is delivered to the PHA material 108G. The compressed air may function to blow away excess water from the surface of the PHA material 108G.

Figure 5B:
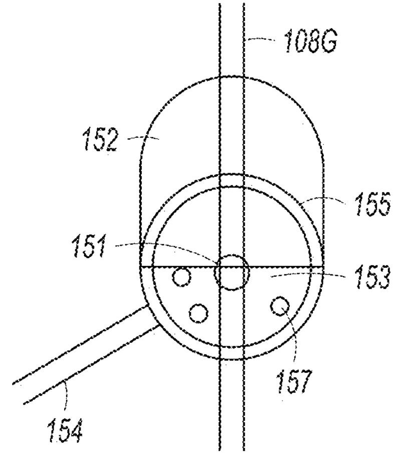

FIG. 5B provides a detailed view of an air ring 152. As shown, the air ring 152 may have a cover portion 155 and a guide portion 151. As the PHA material 108G is pulled through the guide portion of the air ring 152, compressed air may be delivered to the PHA material 108G in an inner region 153 defined by the air ring 152. The compressed air may be delivered to the PHA material 108G via a plurality of air discharge ports 157 defined by the air ring 152. A pulley 156 may be provided to aide movement of the PHA material 108H out of the water removal system 150 and into the puller 116.

As described above, the puller 116 may be configured to pull the PHA material 108E/108F through the two-stage water bath 114. As shown in FIG. 1, the puller 116 may include one or more foam belts 127. Each of the belts 127 may be driven by a respective pair of rollers 125. One belt 127 may be driven to rotate in a clockwise direction, while the other belt 127 may be driven to rotate in a counterclockwise direction. The belts 127 may cooperate to grip the PHA material 108H as it passes through the puller 116. Thus, the puller 116 may be configured to pull the PHA material in its various stages from the output of the die 106, through the two-stage water bath 114, and into the puller 116. And, thus, the puller 116 may also be configured to push the PHA material 108H through to a cutter 120.

The belts 117 may be made entirely or partially of a rubber material, such as an all-natural gum rubber, for example. The material of which the belts 117 are made may have a durometer of 30-55, preferably 45. In a typical system for manufacturing polypropylene straws, the material of which the puller belts are made may have a durometer of more than 90. It has been discovered that, as the stream of PHA material 108H is pulled through the puller 116, grooves form in the belts. The grooves correspond to the diameter of the PHA material 108H. After the grooves form, the belts are even better able to grip the material 108H than they are before the grooves form.

Figure 6:
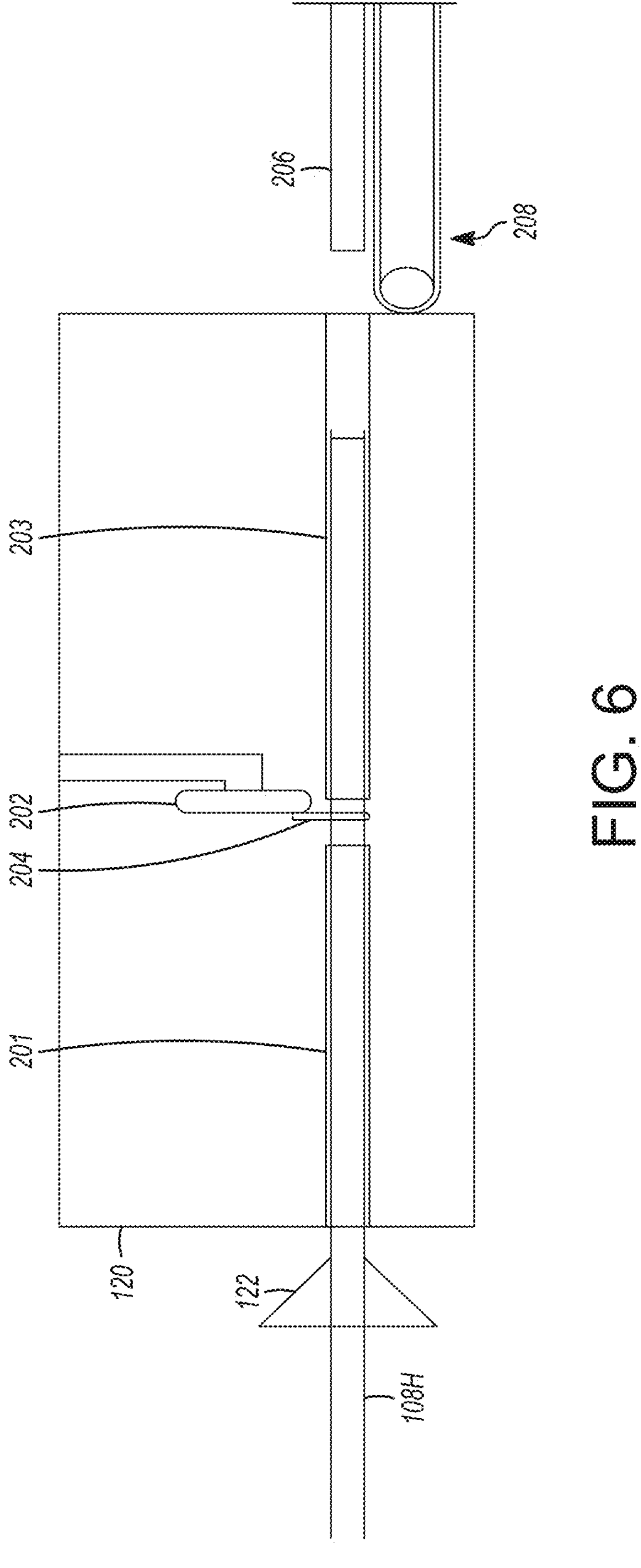
FIG. 6 depicts an example cutter for use in manufacturing PHA drink straws in accordance with the methods disclosed herein.

FIG. 6 depicts an example cutter for use in manufacturing PHA drink straws in accordance with the methods disclosed herein. The cutter 120 may be configured to cut the PHA material 108H at regular intervals to produce PHA straws 206 having a desired straw length. As shown in FIG. 6, the cutter 120 may receive the PHA material 108H and feed the PHA material 108H toward a flywheel 202. The PHA material 108H may be fed toward the flywheel 202 via an entrance tube 201. The flywheel 202 may be a sixteen-inch flywheel. The flywheel 202 may include one or more cutting blades 204 for cutting the PHA material 108H to the desired straw length. The cutting blades 204 may cut the PHA material 108H between the entrance tube 201 and an exit tube 203. The inner diameters of the entrance tube 201 and the exit tube 203 may correspond to the outer diameter of the PHA material 108H. That is, the cutting tubes may have inner diameters that correspond to the outer diameter of the straw being manufactured. The cutting tubes 201 and 203 may have inner diameters that are about 40% bigger than the desired outer diameter of the straw. For example, if the desired outer diameter of the finished straw product is about 286 mils, the inner diameters of the cutting tubes 201 and 203 may be about 396 mils.

The cutter 120 may receive the PHA material 108H through a funnel 122 or other funnel-shaped object. The diameter of the funnel 122 at the end closer to a cutting blade 204 of the cutter 120 may correspond to the outer diameter of the straw being produced. The PHA material 108H may be fed through the funnel 122 toward the cutting blade 204 for being cut to the appropriate length. The funnel 122 may be increased at the end toward the cutting blade 204 by about twenty-five thousandths of an inch when processing the PHA material 108H, as compared to when the system is processing other stronger material, such as polypropylene material. The increase in size may compensate for the PHA material 108H being less firm at this stage of the process and in order to feed more easily through the funnel 122. The PHA material 108H may be fed to the cutting blade for being cut to a desired length.

After the PHA material 108D is cut, a resulting straw 206 of the desired length may be discharged through the exit tube 203 and onto a conveyor belt 208.

In some situations, the finished straws 206 may not be completely dry even after they have been cut to length. Accordingly, an apparatus for making PHA straws may include an end-of-line air drying system. With reference once again to FIG. 1, the end-of-line air drying system may include one or more hot-air chambers 132, and a drying oven 134. Each of the one or more hot-air chambers 132 may include a respective electric hot-air fan 133. Each of the one or more hot-air fans 133 may be driven by a respective blow motor (not shown). The one or more hot-air chambers 132 may be coupled onto the conveyor system such that the fans 133 are situated over the conveyor belt 208. Thus, as the finished straws 206 are carried along on the conveyor belt 208, hot air generated by the fans 133 will dry the straws 206 as they pass through the hot-air chambers 133. The temperature of the hot-air fans may be set at about 500 F. The conveyor belt 208 may carry the straws 206 into a drying oven 134 for a final drying before the finished straws are deposited into an accumulation bin 136. The temperature of the drying oven may be set at about 190 F. The finished straws 206 may then be removed from the accumulation bin 136 to be wrapped and bagged.

A vision system 140 may be provided to monitor certain characteristics of the PHA material 108H just before it is pulled into the puller 116. For example, a vision system 140 may be provided to monitor the diameter and material thickness of the PHA material 108H.

Figure 7:
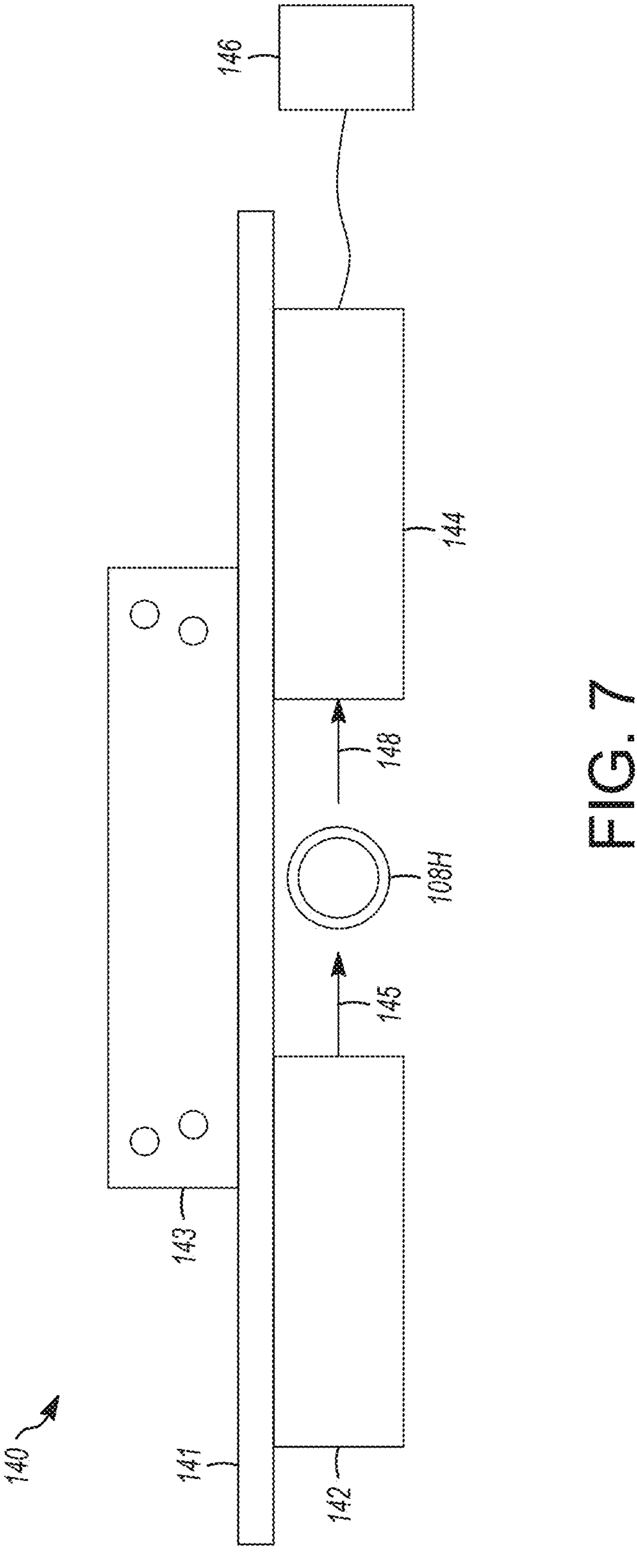
FIG. 7 depicts an example vision system for use in manufacturing PHA drink straws in accordance with the methods disclosed herein.

FIG. 7 depicts an example vision system 140 for use in manufacturing PHA drink straws in accordance with the methods disclosed herein. As shown, the vision system 140 may include a light projector 142, and a camera 144. The light projector 142 may project light 145 onto the PHA material 108H as it is being pulled into the puller 116 (not shown in FIG. 7). The camera 144 may receive light 148 that has passed through or around the PHA material 108H. A vertical mounting bracket 143 and a horizontal mounting bracket 141 may be provided for mounting the vision system 140.

The camera 144 may be electrically coupled to an analyzer 146, which may be a computer processor. The spatial pattern of the received light will be affected by the PHA material 108H blocking some of the emitted light 145 that is incident on it. The analyzer 146 determines from the spatial pattern of the received light 148 whether the diameter of the PHA material is within acceptable tolerances at this stage of the process. The intensity of the received light will be affected by the PHA material 108H blocking some of the emitted light 145 that is incident on it. The analyzer 146 determines from the intensity of the received light 148 whether the material thickness of the PHA material 108H is within acceptable tolerances at this stage of the process. If the analyzer 146 determines that either the diameter or the material thickness is outside of acceptable tolerances, the analyzer may provide any or all of an alarm sound, or visual alarm (e.g., a light), or a message, to indicate that corrective action needs to be taken at some point along the system.

Figure 10:
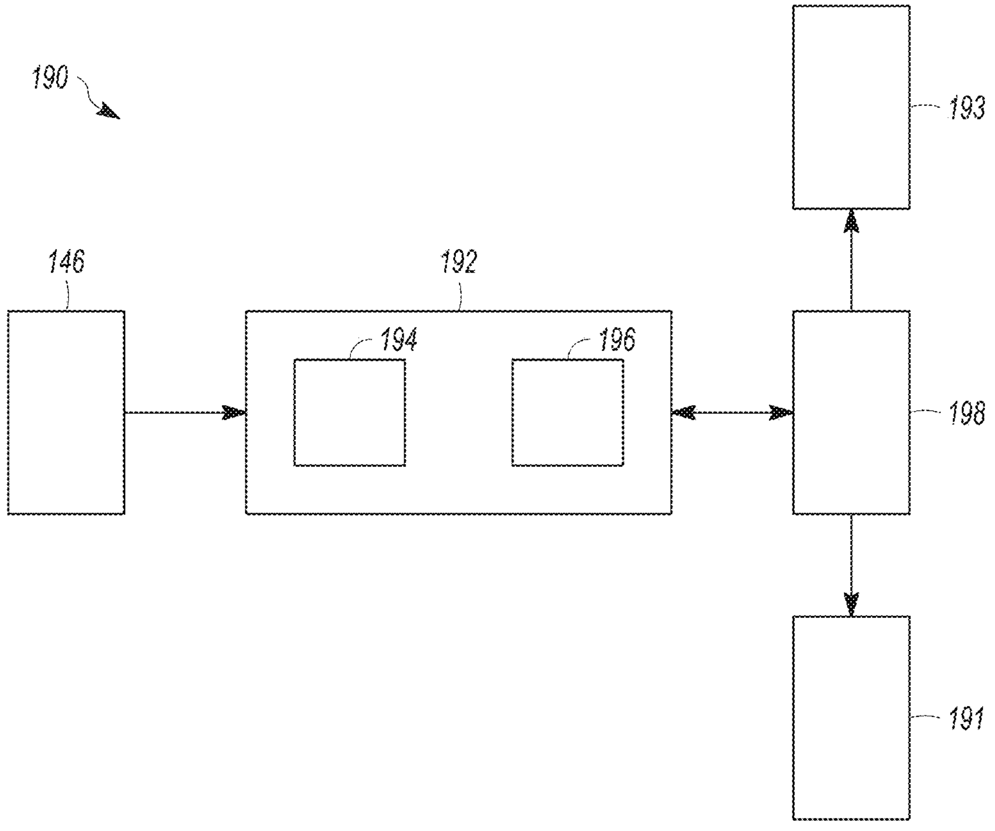
FIG. 10 provides a functional block diagram of a material thickness and diameter monitoring system.

FIG. 10 provides a functional block diagram of monitoring system 190 for monitoring the material thickness and diameter of the PHA material as it is being pulled into the puller. The monitoring system 190 may include the analyzer 146, a controller 192, a user interface 198, a local display 191, and a remote display 193.

The controller 192 may be a programmable logic controller (PLC). The controller 192 may include a data store 194 and a software platform 196. The software platform 196 may be an off-the-shelf product, such as IGNITION, for example. IGNITION is an integrated software platform for supervisory control and data acquisition (SCADA) systems, released by Inductive Automation in January 2010. The software platform 196 may be based on a SQL database-centric architecture. The IGNITION platform may have three main components: an Ignition Gateway, a Designer, and one or more runtime clients. Independent modules may provide separate functionality in any or all of the platform components. Ignition SCADA modules may provide features such as, for example, real-time status control, alarming, reporting, data acquisition, scripting, scheduling, manufacturing execution, and mobile support.

The vision system 140 may include a user interface 198. The user interface 198 may be a custom user interface (U/I) that is configured to receive input data, sort the input data, and provide visual representations of the data, such as a line graph or EXCEL pivot table. The software that is configured to produce the user interface may sit on the software platform 196.

The vision system 140 may include a local display 190. The local display 190 may be a data display, i.e., a display that provides a visual representation associated with specific input data. The local display 190 may be a real-time data display, i.e., a display that provides such a visual representation in real-time as the input data is provided. The local display 190 may be associated with a production line that is being monitored. The local display 190 may be located in close proximity to the production line. For example, the local display 190 may be located on the production floor of the manufacturing facility. Accordingly, a person, such as a line operator, for example, may be able to monitor (i.e., view and analyze) the performance of one or more local production lines simultaneously.

The vision system 140 may include a remote display 191. The remote display 191 may be a real-time data display. The remote display may be located at a location that is remote from the production line that is being monitored. For example, the remote display may be located in a plant manager's office. Accordingly, a person, such as the plant manager, for example, may be able to monitor (i.e., view and analyze) the performance of one or more remote production lines simultaneously.

Figure 11:
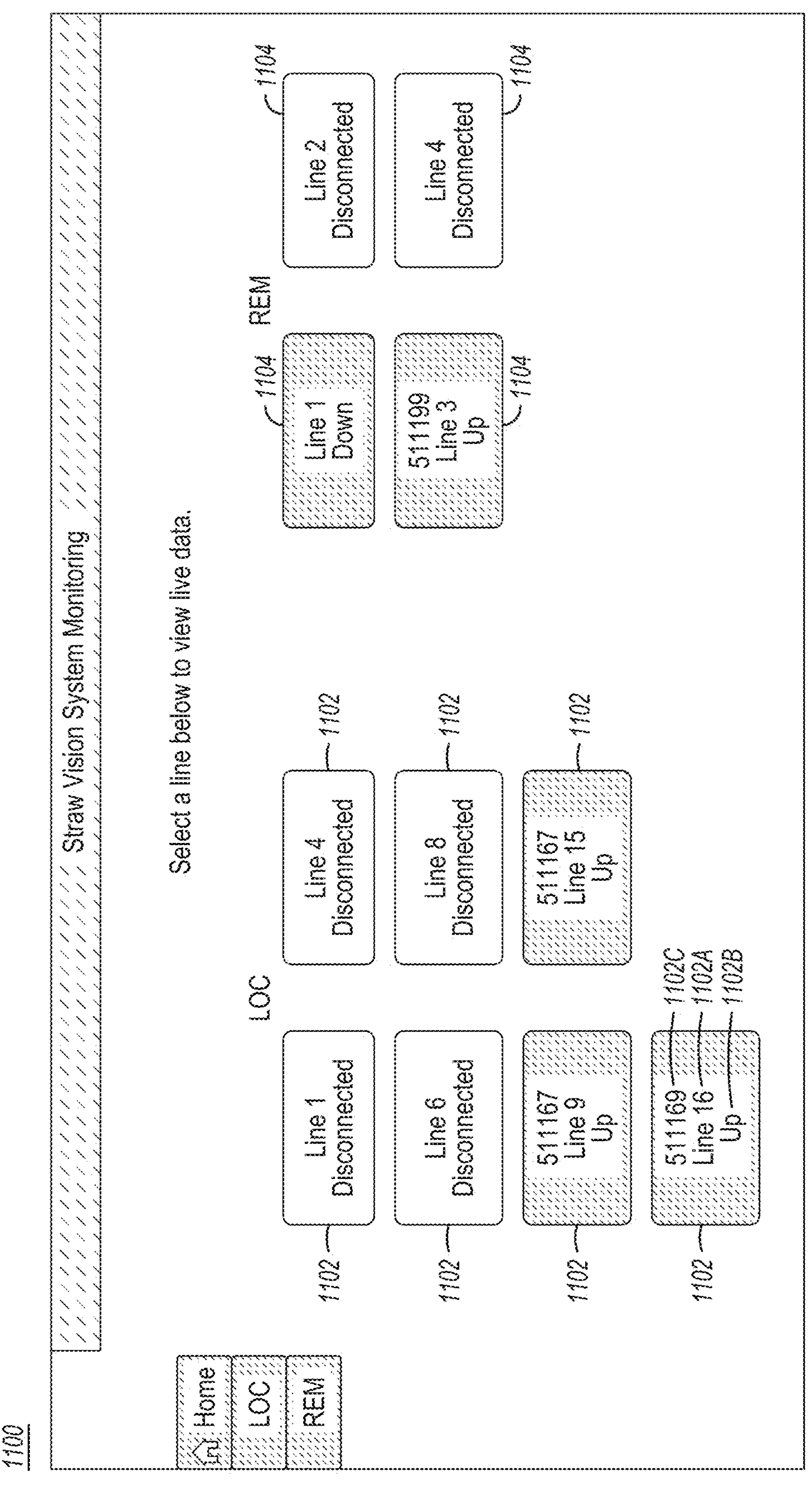
FIGS. 11-19 depict example user interface displays for a straw thickness and diameter monitoring system.

FIGS. 11-19 depict example user interface displays for a straw thickness and diameter monitoring system. FIG. 11 depicts a user interface display 1100 that is configured to enable a user to view the current status of one or more production lines at one or more production facilities. The user interface 1100 may be configured to allow the user to view the current status of one or more productions lines at a local production facility and one or more productions lines at one or more remote production facilities.

The user interface 1100 may present information related to each of the production facilities. As shown in FIG. 11, information related to one or more production facilities (LOC, REM) may be presented. A production facility may be a local production facility LOC (i.e., a facility where the user is located) or a remote production facility REM (i.e., a facility other than where the user is located).

With regard to a local production facility LOC, a plurality of local line status items 1102 may be displayed. Each local line status item 1102 may present information related to a respective production line located at the local production facility LOC. Each local line status item 1102 may include a respective line identifier 1102A corresponding to the respective local production line (e.g., Line 16). Each local line status item may include a line status indicator 1102B corresponding to the status of the respective local production line 1102A. Line status indicators 1102B may include, for example, "Disconnected" (i.e., the line is non-operational), "Up" (i.e., the line is operational and functioning to produce straws at the moment), and "Down" (i.e., the line is operational, but not functioning to produce straws at the moment). When a production line 1102A is "Up," the line status item 1102 may also include a product identifier 1102C, which indicates which product is currently in production on that line (e.g., 511169).

The user may select one of the line status items 1102 to view live data related to the selected line 1102A. Consider that the user has selected (i.e., hovered over or clicked on) the line status item 1102 for product ID 511167, which is currently being manufactured on line 9 at the local production facility LOC. In response to the user's selection of the line status item 1102, a user interface display as depicted in FIG. 12 may be displayed.

Figure 12:
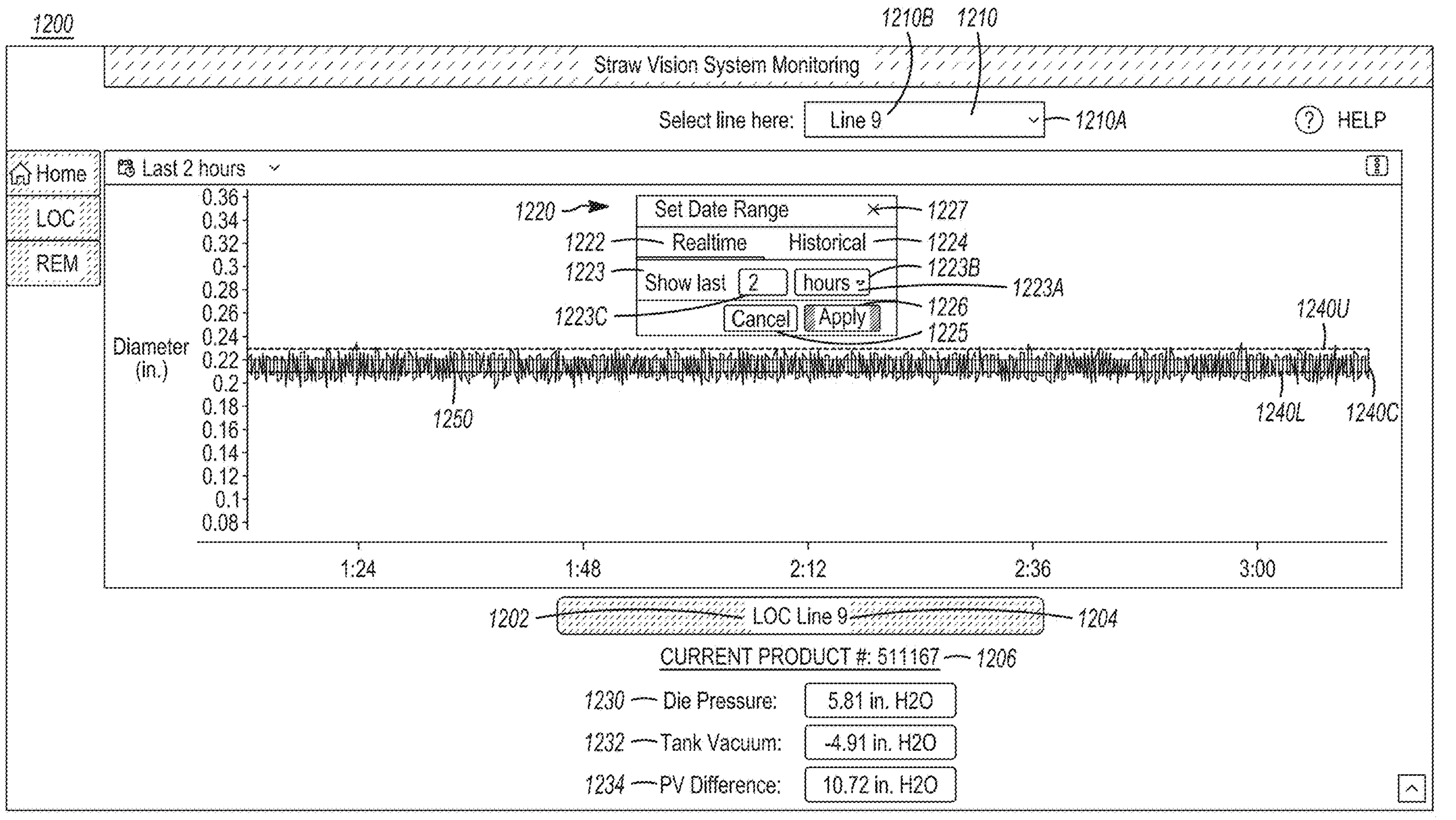

As depicted in FIG. 12, a user interface display 1200 may include a production facility identifier 1202 and a production line identifier 1204. The production facility identifier 1202 may provide an identity of the production facility (e.g., LOC) at which the identified production line (e.g., Line 9) is located. The user interface display 1200 may also include a product identifier 1206, which may identify a product (e.g., #511167) that is currently being produced on the identified production line (e.g., Line 9) at the identified production facility (e.g., LOC).

The user interface 1200 may include an interactive line selection box 1210. The line selection box 1210 may include a dropdown menu selection item 1210A. The user may select the dropdown menu selection item 1210A. In response to the user's selection of the dropdown menu selection item 1210A, the user interface display 1200 may provide a dropdown menu (not shown). The dropdown menu may provide one or more options for selecting a production line. The user may select the production line of interest (e.g., Line 9). In response, the user interface display 1200 may display the selected production line identifier 1210B. Alternatively, the user may enter directly into the line selection box 1210 an identity of a production line at the selected production facility.

The user interface 1200 may include an interactive date range selection box 1220. The date range selection box 1220 may provide options for the user to select to cause the user interface 1200 to provide a realtime display of production data, or to cause the user interface to display historical production data. For example, the user may select the "Realtime" option 1222. In response to the user's selection of the "Realtime" option 1222, the user interface 1200 may provide an interactive time period selection box 1223. The time period selection box 1223 may include a time unit selection box 1223A. The time unit selection box 1223A may include a dropdown menu selection item 1223B. The user may select the dropdown menu selection item 1223B. In response to the user's selection of the dropdown menu selection item 1223B, the user interface 1200 may provide a dropdown menu (not shown). The dropdown menu may provide one or more options for selecting a time unit. The user may select the time unit of interest (e.g., "hours"). In response, the user interface 1200 may display the selected time unit. Alternatively, the user may enter the time unit directly into the time unit selection box 1223A.

The time period selection box 1223 may also include a time unit quantity selection box 1223C. The time unit quantity selection box 1223C may include a dropdown menu selection item (not shown). The user may select the dropdown menu selection item. In response to the user's selection of the dropdown menu selection item, the user interface display 1200 may provide a dropdown menu (also not shown). The dropdown menu may provide one or more options for selecting a time unit quantity. The user may select the time unit quantity of interest (e.g., "2" as shown in FIG. 12). In response, the user interface display 1200 may display the selected time unit quantity. Alternatively, the user may enter the time unit quantity (e.g., "2") directly into the time unit quantity selection box 1223C.

The date range selection box 1220 may also include a "Cancel" button 1225, which the user can select to cause the system to cancel the selected date range operation. The date range selection box 1220 may also include an exit button 1227, which the user can select to cause the date range selection box 1220 to disappear from the user interface 1200. The date range selection box 1220 may also include an "Apply" button 1226, which the user can select to cause the user interface 1200 to begin to display realtime production data corresponding to the product currently being produced on the selected production line.

As shown in FIG. 12, the production data 1250 may include the current diameter of the tubular PHA material 108H, as a function of time of day. The diameter of the tubular material may be sampled at regular intervals, e.g., once every minute. The user interface 1200 will display the diameter in whatever unit is desirable (e.g., inches) for the selected quantity of time units (e.g., the past 2 hours). The user interface 1200 may also include one or more tolerance lines. A first tolerance line 1240C may show the desired diameter of the tubular material. A second tolerance line 1240U may be provided to show the upper tolerance limit on the diameter of the tubular material. A third tolerance line 1240L may be provided to show the lower tolerance limit on the diameter of the tubular material.

The user interface 1200 may include one or more performance measure displays. For example, as shown in FIG. 12, the user interface 1200 may include a die pressure display 1230, a tank vacuum display 1232, and a pressure/vacuum difference display 1234. The die pressure display 1230 may provide an indication of the current die pressure on the selected line 1204. The tank vacuum display 1232 may provide an indication of the current tank vacuum on the selected line 1204. And the pressure/vacuum difference display 1234 may provide an indication of the current ratio of die pressure to tank vacuum on the selected line 1204. Thus, at a glance, one can see whether the diameters of the straws that are currently being produced on the selected line at the selected location are within acceptable tolerances. If not, corrective action can be taken, say, by adjusting the die pressure or the tank volume or both.

Figure 13:
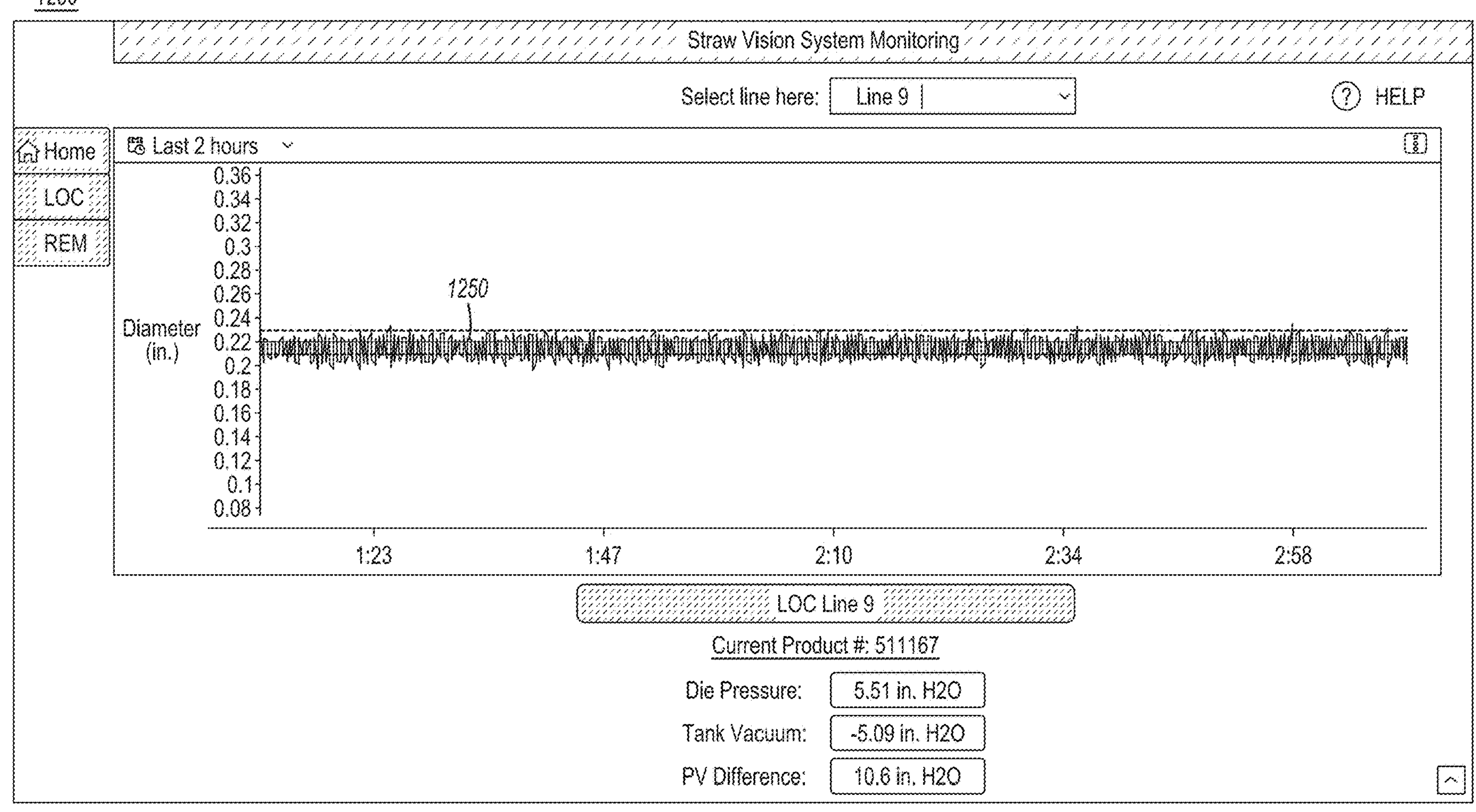

FIG. 13 depicts a user interface display 1200 in which the production data 1250 described above may continue to be displayed and monitored in real time.

Figure 14:
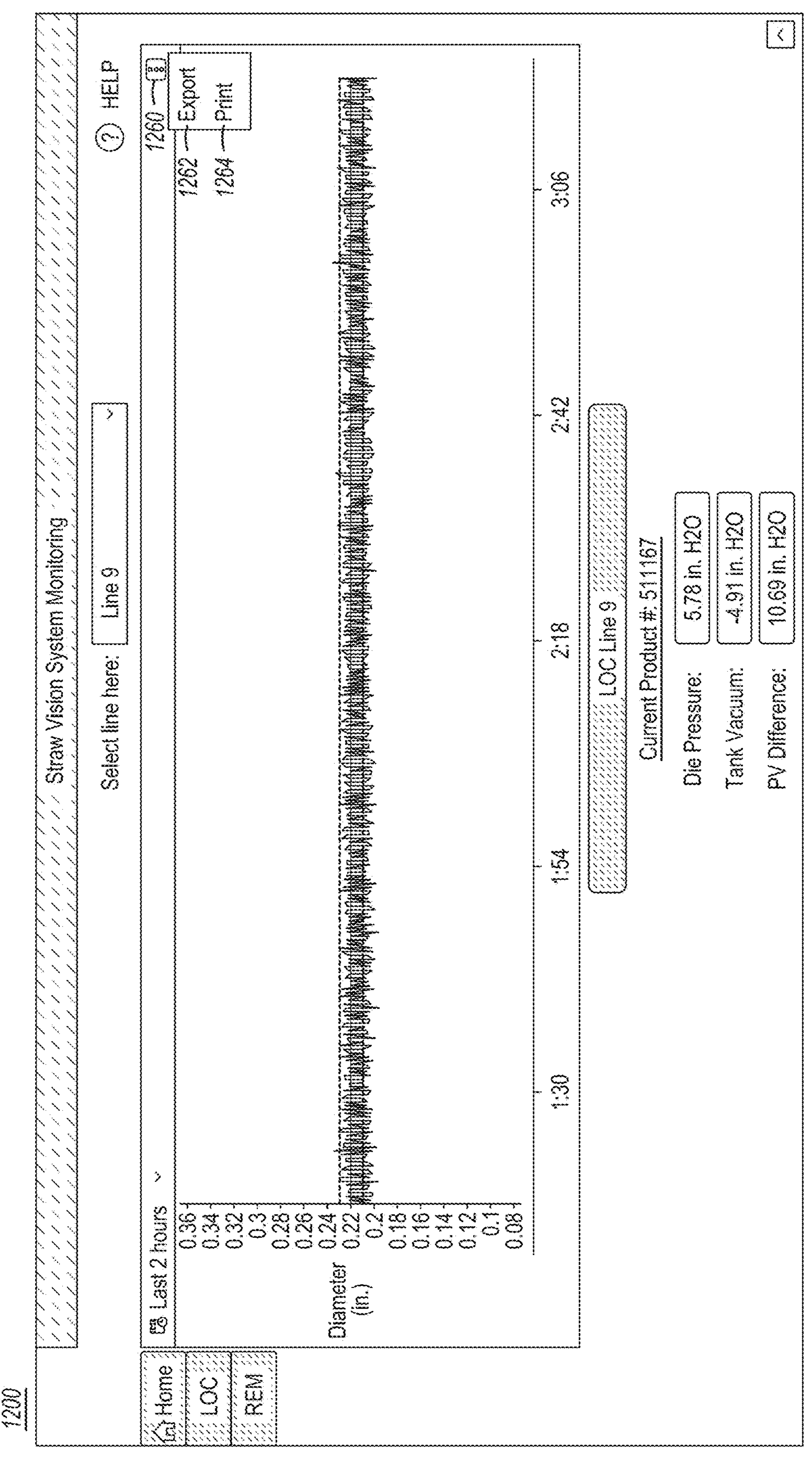

FIG. 14 depicts a user interface display 1200 in which the user is provided with options to export or print the current data display. As shown, the user interface display 1200 may include a dropdown menu selection item 1260. A user may select the dropdown menu selection item 1260. In response to a user's selection of the dropdown menu selection item 1260, a dropdown menu may be displayed. The dropdown menu may include a plurality of data dump options, such as "Export" 1262 and "Print" 1264, for example. A user may then select one of the data dump options. In response to a user's selection of the "Export" option 1262, the current data being displayed may be exported to a data file. The data file may be an EXCEL spreadsheet, for example. In response to a user's selection of the "Print" option 1264, the current data being displayed may be printed to a printer that is connected to the network. Mechanisms for printing data and for exporting data to a data file such as an EXCEL spreadsheet are well known, and need not be specified here in any detail.

Figure 15:
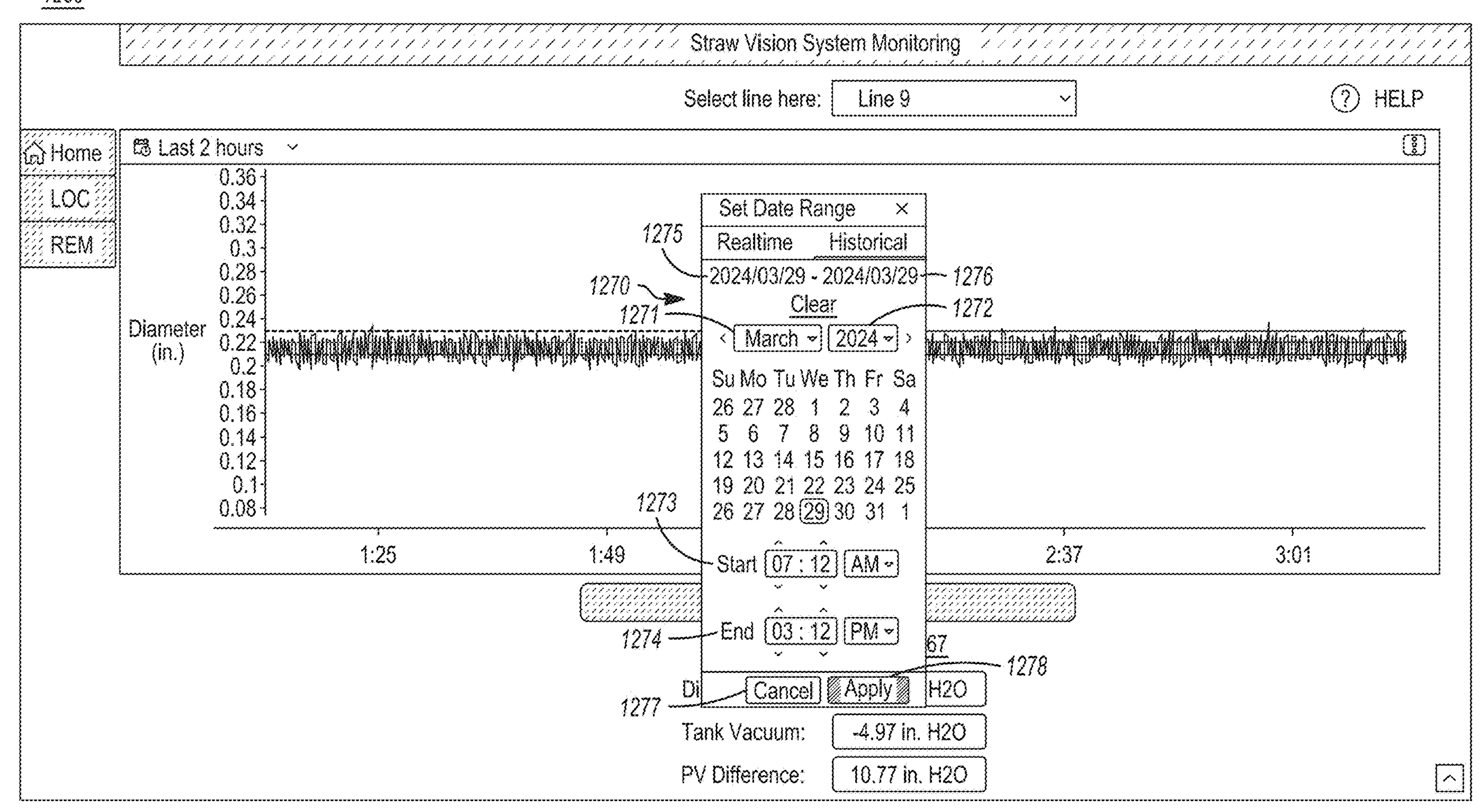

With reference again to FIG. 12, the user may select the "Historical" option 1224. In response to the user's selection of the "Historical" option 1224, the user interface 1200 may provide an interactive datetime selection box 1270, as depicted in FIG. 15. The datetime selection box 1270 may include a month selection box 1271, a year selection box 1272, a start-time selection box 1273, and an end-time selection box 1274, from which the user can define an historical period of production time. From the datetime selection box 1270, the user may select (or enter) a start date, 1275 and an end date 1276. The user may also select (or enter) a start time 1273 and an end time 1274. The datetime selection box 1270 may include a "Clear" button (not shown), which will cause the user interface to clear the current date and time selections, a "Cancel" button 1277, which will cause the system to cancel the operation, and an "Apply" button 1278, which will cause the system to display the production data for the defined historical period. The mechanisms by which buttons are selected, data is entered, and dropdown menus are employed are described in detail above, and need not be repeated here.

Figure 16:
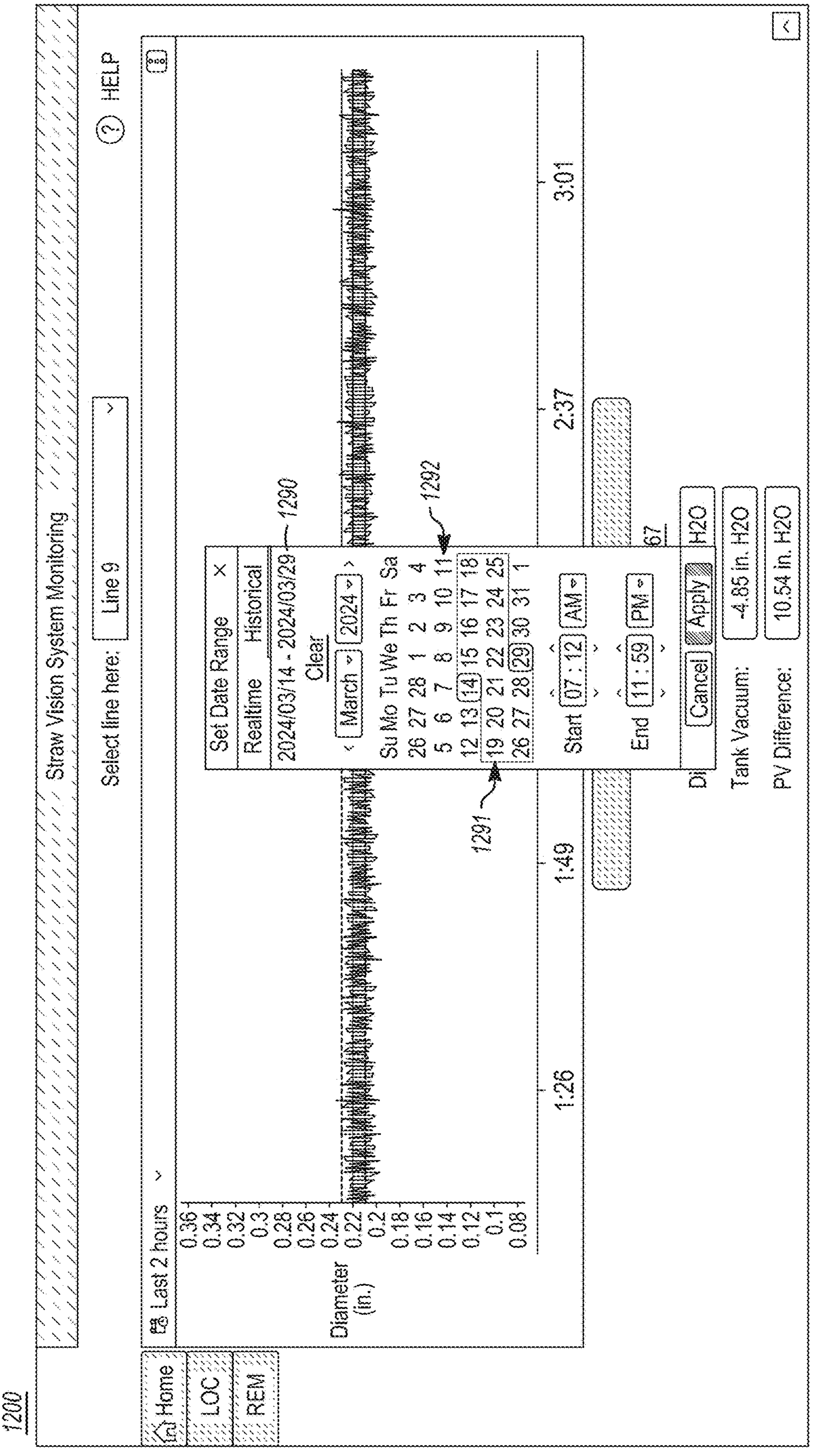

FIG. 16 provides a user interface display 1200 that provides a representation of a defined historical period. The user interface 1200 displays a selected date range 1290 (e.g., Mar. 14, 2023, through Mar. 29, 2023), which may be depicted on a calendar display item 1292, as shown. The user interface 1200 also displays a selected time period for each day of the selected date range 1290 (e.g., 7:12 am through 3:12 pm). The user can select the start month, and then click on a start day within that month. The user can select the end month, which may or may not be the same as the start month, and click on the end date within that month. The user interface 1200 may display bordering 1291 around the dates that define the selected historical period. As shown, the start date (e.g., 14) and end date (e.g., 29) may be double-bordered.

Figure 17:
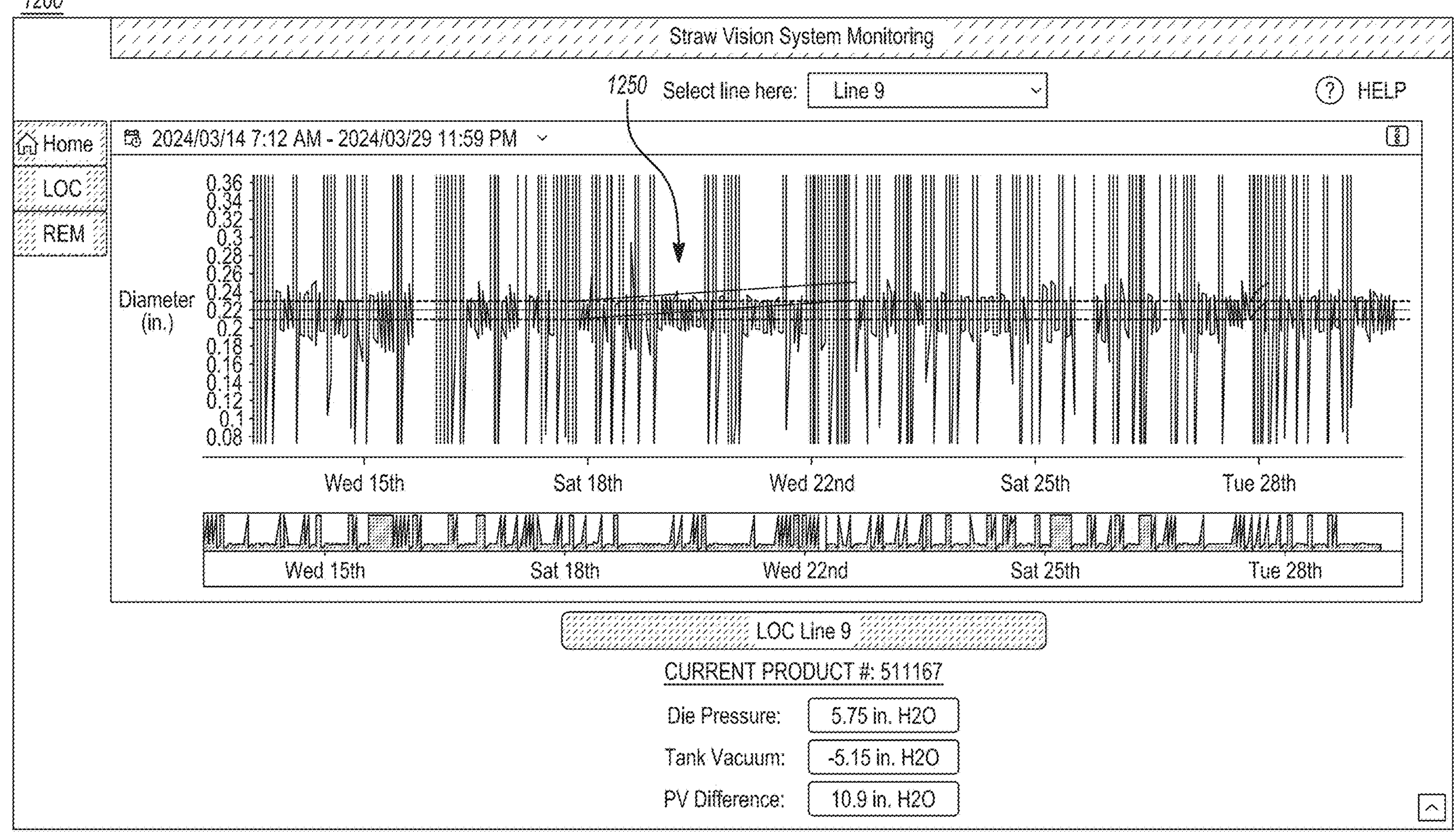

FIG. 17 depicts a user interface display 1200 in which the production data 1250 described above is displayed for the defined historical period (e.g., 2023/03/14 7:12 AM-2023/03/29 11:59 PM). Note the entries that are cut off at the top or bottom of the display 1200. During these periods of time, the selected production line (e.g., line 9) was down or disconnected. Thus, at a glance, one can see whether the diameters of the straws that were being produced on the selected line at the selected location during the defined historical period were within acceptable tolerances. Historical data may be stored for a predefined period of time, such as, for example, up to one year.

Figure 18:
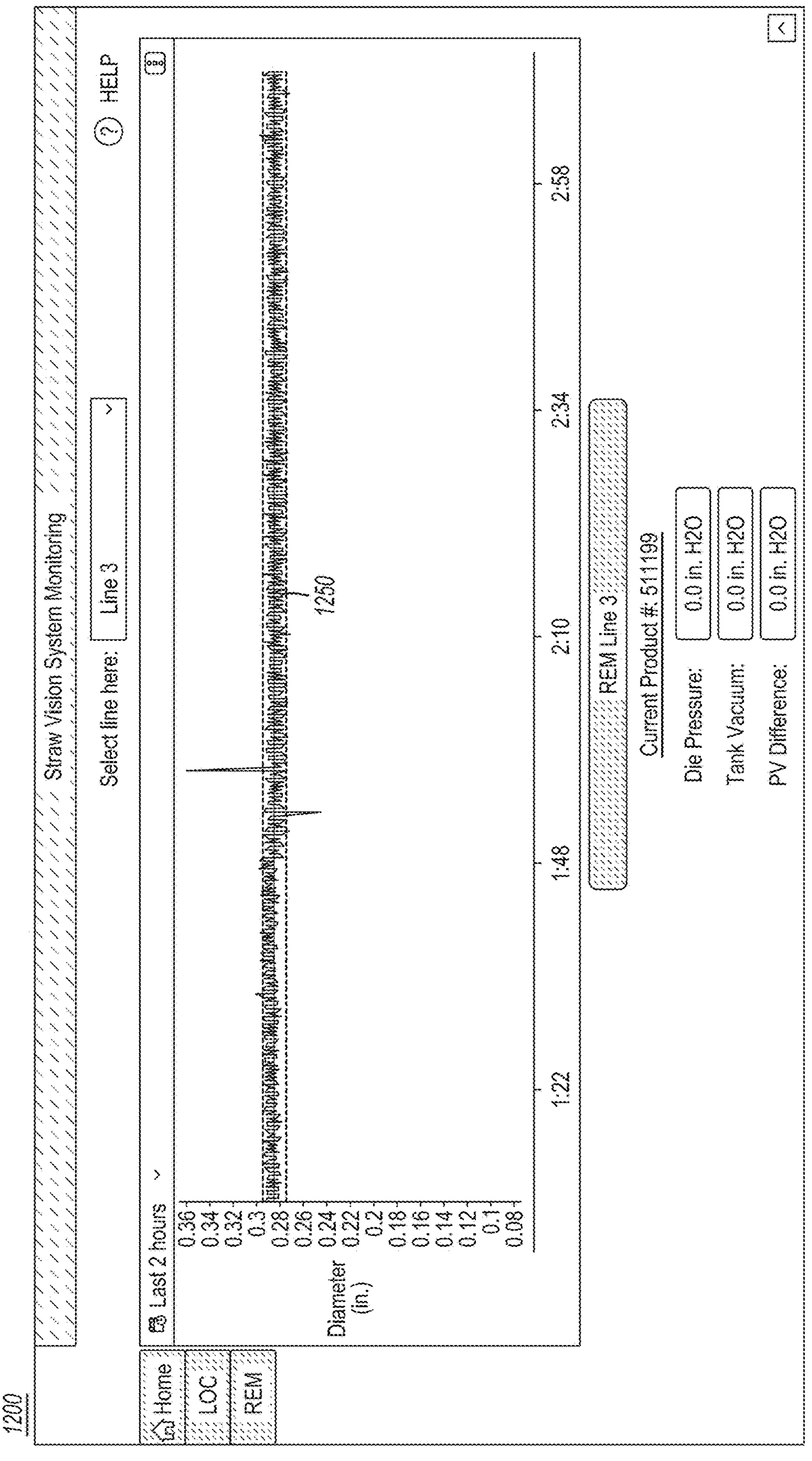

With reference again to FIG. 11, consider that the user has selected the line status item 1104 for product ID 511199, which is currently being manufactured on line 3 at a remote production facility REM. In response to the user's selection of the line status item 1104, a user interface display 1200 as depicted in FIG. 18 may be displayed. The elements depicted in FIG. 18 are, in all material respects, the same as those depicted in FIG. 13, except that the data 1250 displayed in FIG. 18 corresponds to product being manufactured at a remote production facility REM. All the displays and options described above in connection with FIGS. 12-17 can be provided for a remote production facility as well.

Figure 19:
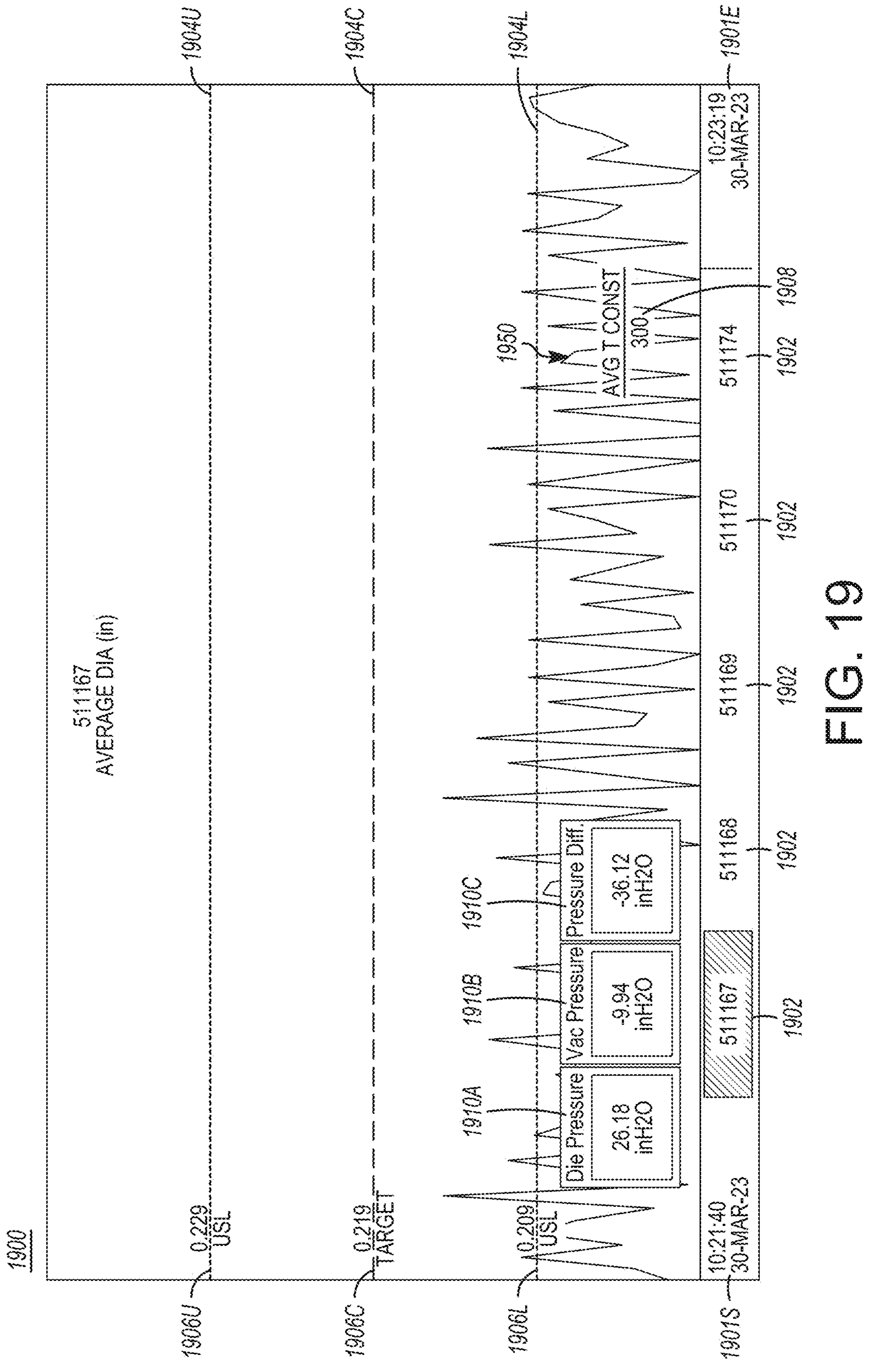

FIG. 19 depicts a user interface 1900 that provides a display of product data for a plurality of products over a selected period of time. As shown, the user can select a period of time (e.g., 100 seconds) having a start time 1901S and an end time 1901E. The user interface 1900 may include a plurality of product selection items 1902, each of which is associated with a product being produced, or having been produced, on a line at a local or remote production facility. Each product selection item 1902 may include a unique product identifier, e.g., 511167, that identifies the product associated with the product selection item.

In response to a user's selection of one of the product selection items 1902, the user interface 1900 may provide a display of product data associated with the selected product. For example, as shown in FIG. 19, the user interface may provide a plot 1950 of average straw diameter as a function of time for the selected period. The user interface may also display an averaging interval 1908 (e.g., 300 seconds) over which each of the averages is taken. Thus, the plot 1950 of average straw diameter may be an historical plot. That is, the user interface 1900 may provide, at each time between the start time and the end time, the average of all the samples taken during preceding the time interval. For example, as shown in FIG. 19, the average displayed at any point in time may be the average of all samples taken over the last 300 seconds, which would be the last 300 samples, assuming samples are taken once every second.

The user interface 1900 may also include one or more tolerance lines. A first tolerance line 1904C may show the desired diameter of the tubular material. A second tolerance line 1904U may be provided to show the upper tolerance limit on the diameter on the diameter of the tubular material. A third tolerance line 1904L may be provided to show the lower tolerance limit on the diameter of the tubular material. The user interface 1900 may also display actual values 1906C, 1906U, and 1906L for the desired straw diameter, upper tolerance limit, and lower tolerance limit, respectively.

The user interface 1900 may include one or more performance measure displays. For example, as shown in FIG. 19, the user interface 1900 may include a die pressure display 1910A, a tank vacuum display 1910B, and a pressure/vacuum difference display 1910C. The die pressure display 1910A may provide an indication of the average die pressure over the selected period of time. The tank vacuum display 1910B may provide an indication of the average tank vacuum over the selected period of time. And the pressure/vacuum difference display 1910C may provide an indication of the average ratio of die pressure to tank vacuum over the selected period of time. Thus, at a glance, one can see whether the diameters of the straws that were produced during that period of time were within acceptable tolerances. If not, corrective action can be taken, say, by adjusting the die pressure or the tank volume or both.

Figure 8A:
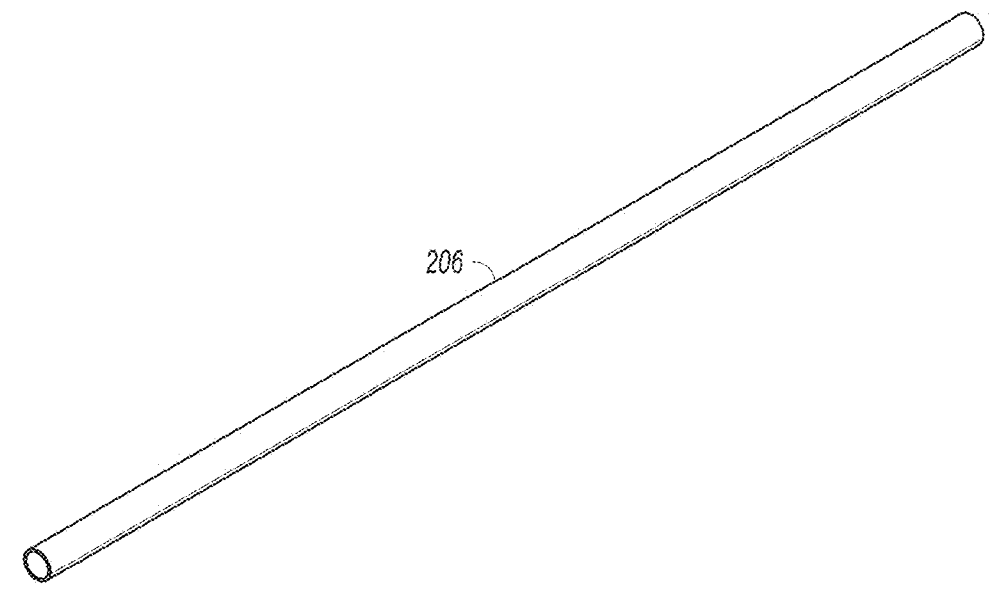
FIG. 8A depicts an example drink straw.
Figure 8B:
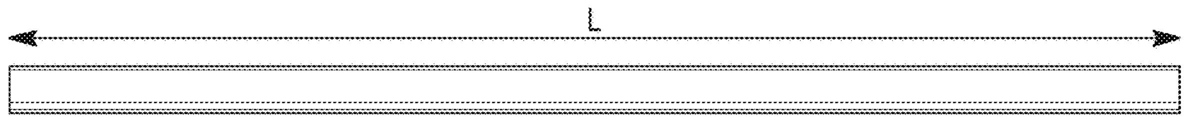
FIG. 8B is a side plan view of the drink straw depicted in FIG. 8A.
Figure 8C:
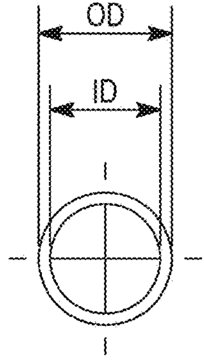
FIG. 8C is a cross-sectional view of the drink straw depicted in FIG. 8A.

It should be understood that PHA straws produced according to the systems and methods described herein may have various lengths, diameters, and material thicknesses. FIG. 8A depicts an example drink straw 206, which may be made of a PHA material. FIG. 8B is a side plan view of the drink straw 206 depicted in FIG. 8A. FIG. 8C is a cross-sectional view of the drink straw 206 depicted in FIG. 8A. As shown, the straw 206 may have a tubular body. The tubular body may define a hollow tube. The tubular body of the straw 206 may have a length, L, an inner diameter, ID, and an outer diameter, OD. The material thickness of the straw 206, that is, the thickness of the walls of the tubular body of the straw, may be a function of the inner diameter ID and the outer diameter OD. Specifically, the material thickness of the straw 206 may be half the difference between the outer diameter OD and the inner diameter ID.

The length of the straw 206 may range from about five inches to about 10.5 inches. The material thickness of the straw 206 may range from about five mils to about ten mils, preferably between six mils and seven mils, and typically around eight mils. In an example, a drink straw 206 may have a length of about 7.75 inches, an inner diameter of about 207 mils, an outer diameter of about 219 mils, and a material thickness of about six mils. In another example, a drink straw 206 may have a length of about 10.25 inches, an inner diameter of about 270 mils, an outer diameter of about 284 mils, and a material thickness of about seven mils. In yet another example, a drink straw 206 may have a length of about 8.50 inches, an inner diameter of about 270 mils, an outer diameter of about 284 mils, and a material thickness of about seven mils. In an example that may be suitable for use as a drink stirrer, a drink straw 206 may have a length of about 5.00 inches, an inner diameter of about 103 mils, an outer diameter of about 115 mils, and a material thickness of about six mils. In another example, a drink straw 206 may have a length of about 9.00 inches, a diameter of about 472 mils, and a material thickness of about eleven mils.

It should also be understood that PHA straws produced according to the systems and methods described herein may have useful features in addition to a basic hollow tubular body. For example, a PHA straw produced according to the systems and methods described herein may have a flexible neck portion. In another example, a PHA straw produced according to the systems and methods described herein may have a spiked end portion. Such a straw may be useful in connection with well-known juice boxes.

Figure 9A:
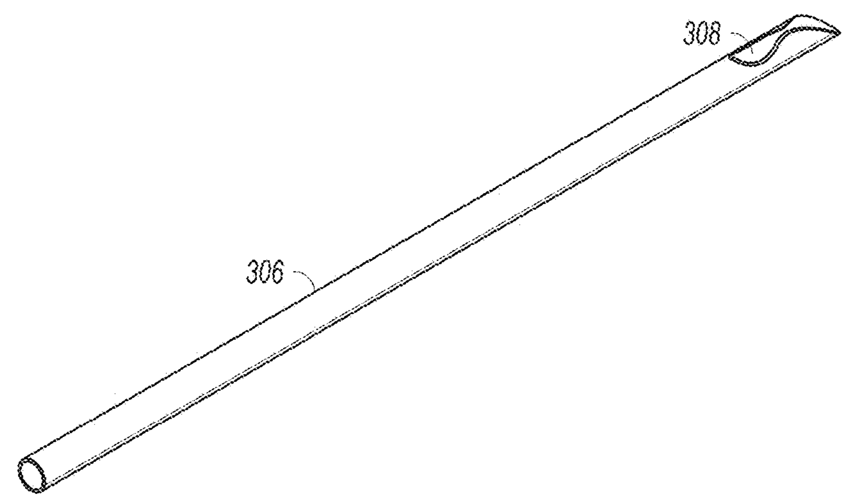
FIG. 9A depicts an example drink straw having a shovel end portion.
Figure 9B:
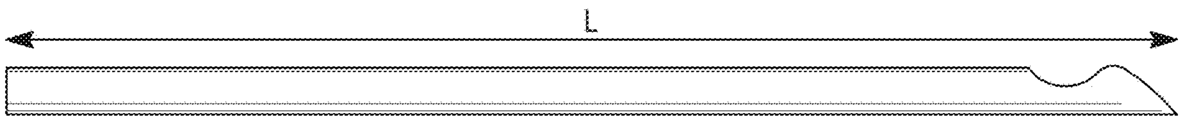
FIG. 9B is a side plan view of the drink straw depicted in FIG. 9A.
Figure 9C:
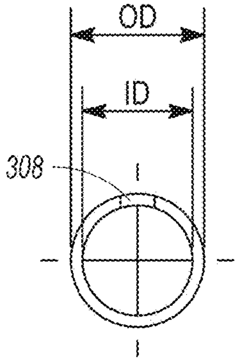
FIG. 9C is a cross-sectional view of the drink straw depicted in FIG. 9A.

In yet another example, a PHA straw produced according to the systems and methods described herein may have a shovel-shaped end portion. Such a straw may be useful in connection with consuming frozen beverages, such a milkshakes, for example. FIG. 9A depicts an example drink straw 306, which may be made of a PHA material. FIG. 9B is a side plan view of the drink straw 306 depicted in FIG. 9A. FIG. 9C is a cross-sectional view of the drink straw 306 depicted in FIG. 9A. As shown, the straw 306 may have a tubular body and a shovel-shaped end portion 308. As described above, the tubular body may define a hollow tube having a length, L, an inner diameter, ID, and an outer diameter, OD.

Although features and elements are described herein in particular combinations, each feature or element can be used alone or in any combination with the other features and elements.

What is claimed is:

1. A vision system for use in manufacturing drink straws from polyhydroxyalkanoate (PHA) material, the vision system comprising:

- a light projector configured to project light onto a stream of PHA material as the PHA material is being pulled from a water bath, the PHA material having a tubular shape;
- a camera configured to receive light that has passed through or around the PHA material as the PHA material is being pulled from the water bath; and
- an analyzer that is electrically coupled to the camera, wherein the analyzer is configured to determine from the received light whether a diameter and material thickness of the PHA material are within acceptable tolerances.

2. The vision system of claim 1, wherein the analyzer is configured to determine from a spatial pattern of the received light whether the diameter of the PHA material is within acceptable tolerances.

3. The vision system of claim 2, wherein the spatial pattern of the received light is affected by the PHA material blocking some of the emitted light that is incident on the PHA material.

4. The vision system of claim 1, wherein the analyzer is configured to determine from an intensity of the received light whether the material thickness of the PHA material is within acceptable tolerances.

5. The vision system of claim 4, wherein the intensity of the received light is affected by the PHA material blocking some of the emitted light that is incident on the PHA material.

6. The vision system of claim 1, wherein, if the analyzer determines that either the diameter or the material thickness of the PHA material is outside of acceptable tolerances, the analyzer provides an alarm.

7. The vision system of claim 1, wherein the analyzer is a computer processor.

* * * * *